United States Patent [19]

Davis et al.

[11] Patent Number: 4,910,510
[45] Date of Patent: Mar. 20, 1990

[54] SYSTEM FOR OFF-THE-AIR REPROGRAMMING OF COMMUNICATION RECEIVERS

[75] Inventors: Walter L. Davis, Coral Springs, Fla.; Nasrin Sirang, Arlington Heights, Ill.

[73] Assignee: Motorola, Inc., Schaumburg, Ill.

[21] Appl. No.: 116,948

[22] PCT Filed: Jan. 2, 1987

[86] PCT No.: PCT/US87/00004
§ 371 Date: Jun. 11, 1987
§ 102(e) Date: Jun. 11, 1987

[51] Int. Cl.$^4$ ............................ H04Q 1/00; H04Q 1/39
[52] U.S. Cl. ............................ 340/825.44; 340/825.47; 340/825.48; 370/92; 455/38
[58] Field of Search ............ 340/825.44, 825.45, 340/825.46, 825.47, 825.48, 825.69, 825.72; 370/80, 92, 93; 455/68, 70, 38, 186, 228

[56] References Cited

U.S. PATENT DOCUMENTS 4,422,071 12/1983 de Graaf ........................ 340/825.44
4,518,961 5/1985 Davis et al. .................... 340/825.44
4,623,887 11/1986 Welles, II ................... 340/825.69 X

FOREIGN PATENT DOCUMENTS 0135783 4/1985 European Pat. Off. .
57-134732 11/1982 Japan .
2068616 8/1981 United Kingdom .
82/01268 4/1982 World Int. Prop. O. .
84/00652 2/1984 World Int. Prop. O. .

Primary Examiner—Ulysses Weldon
Attorney, Agent, or Firm—Philip P. Macnak; Vincent B. Ingrassia

[57] ABSTRACT

A communication receiver is disclosed which can decode signals transmitted by radio frequency propagation. A programmable controller uses instructions in a non-volatile reprogrammable memory to decode and process the signals, and to output the information contained in the signals in a useable form. The controller also responds to predetermined signals by decoding and processing information for new decoding and operating instructions, and stores the data in a temporary memory. Logic circuitry responds to subsequent predetermined signals to enable selective reprogramming of the non-volatile reprogrammable memory by data stored in the temporary memory to alter the decoding characteristics of the receiver.

24 Claims, 24 Drawing Sheets

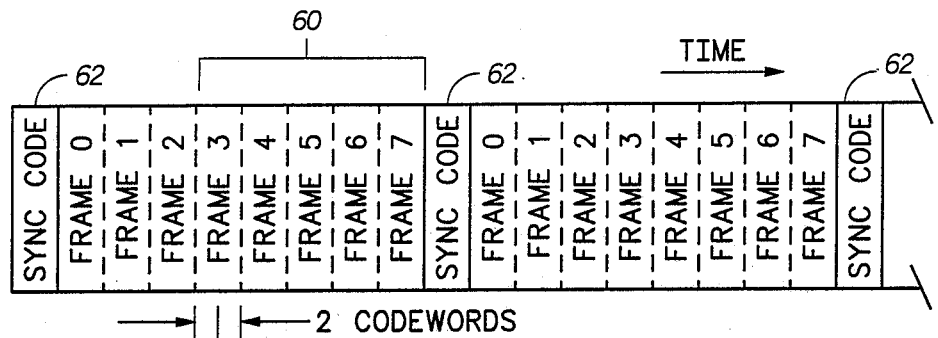
*FIG.3A*
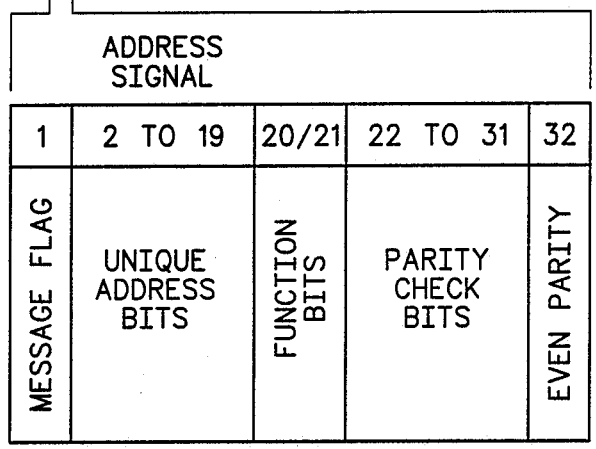
*FIG.3B*
UNIQUE ADDRESS
SIGNALLING CODES
FOR POCSAG
| FUNCTION BITS | FUNCTION |
|---|---|
| 00 | ALERT FUNCTION 1 |
| 01 | ALERT FUNCTION 2 |
| 10 | ALERT FUNCTION 3 |
| 11 | CHANGE CODE FOR ACTIVATING CHANGE IN THE ADDRESS CODE MEMORY USING THE PRESENT SIGNALLING SYSTEM |
*FIG.3C*

RESERVED CODEWORD FUNCTIONS
FOR CODE MEMORY CHANGE COMMAND

| FUNCTION BITS | REGION OF CODE MEMORY TO BE CHANGED |
|---|---|
| 00 | INVALID-NO CHANGE |
| 01 | REGION 1 |
| 10 | REGION 2 |
| 11 | REGION 3 |

SYSTEM CHANGE CODEWORD
FOR CHANGING ALL POCSAG UNITS

| FUNCTION BITS | FUNCTION |
|---|---|
| 00 | CHANGE REGION 1 IN SYSTEM PROGRAM MEMORY |
| 01 | CHANGE REGION 2 IN SYSTEM PROGRAM MEMORY |
| 10 | CHANGE REGION 3 IN SYSTEM PROGRAM MEMORY |
| 11 | CHANGE CODE FOR ACTIVATING A TOTAL CHANGE IN THE SIGNALLING SYSTEM |

UNIQUE ADDRESS
SIGNALLING CODES FOR GSC
FUNCTION 1 (AB) = ALERT FUNCTION 1
FUNCTION 2 (A$\bar{B}$) = ALERT FUNCTION 2
FUNCTION 3 ($\bar{A}$B) = ALERT FUNCTION 3
FUNCTION 4 ($\bar{A}\bar{B}$) = CODE FOR ACTIVATING CHANGES IN THE ADDRESS CODE MEMORY USING THE PRESENT SIGNALLING SYSTEM
*FIG.8C*
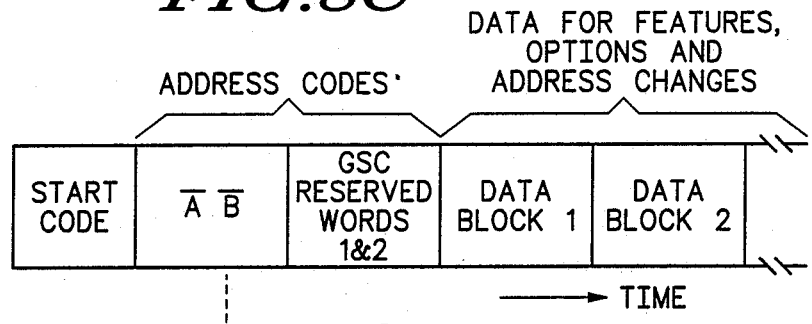
*FIG.8D*
SIGNALLING SEQUENCE FOR CHANGING THE ADDRESS CODE MEMORY FOR AN INDIVIDUAL UNIT
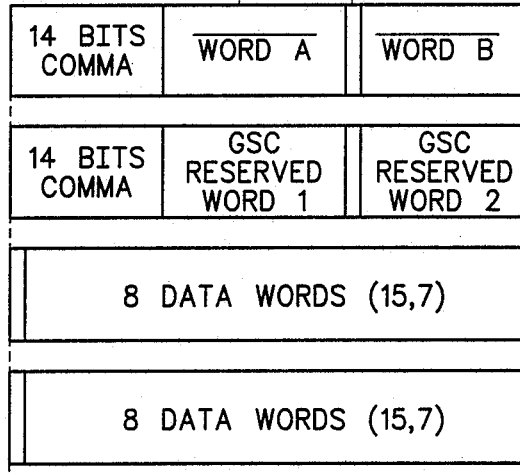
*FIG.8E*

RESERVED CODEWORD FUNCTIONS
FOR CODE MEMORY CHANGE COMMAND
| RESERVED WORD SEQUENCE | | REGION OF CODE MEMORY TO BE CHANGED |
|---|---|---|
| WORD 1 | WORD 2 | INVALID – NO CHANGE |
| WORD 1 | <u>WORD 2</u> | REGION 1 |
| <u>WORD 1</u> | WORD 2 | REGION 2 |
| <u>WORD 1</u> | <u>WORD 2</u> | REGION 3 |
*FIG.8F*
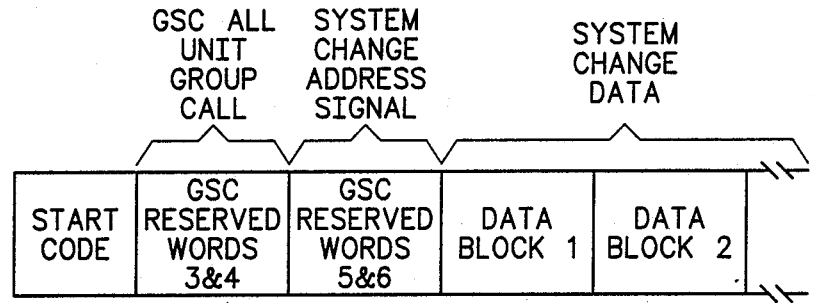
*FIG.9A*
SIGNALLING SEQUENCE FOR
CHANGING DECODING ALGORITHM
IN ALL GSC UNITS
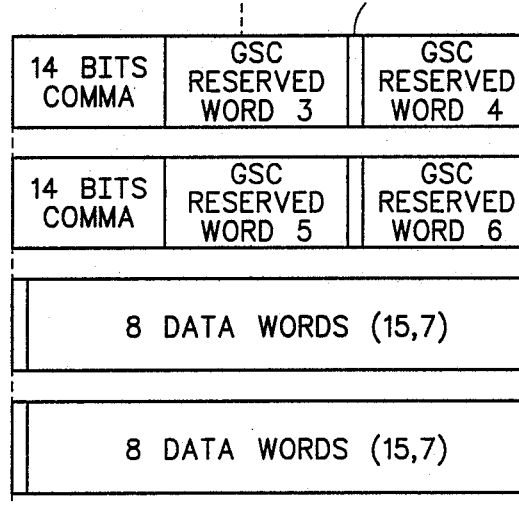
*FIG.9B*

SYSTEM CHANGE SIGNALLING
CODES FOR GSC

| GSC RESERVED WORD SEQUENCE | FUNCTION |
|---|---|
| WORD 5    WORD 6 | CHANGE REGION 1 IN SYSTEM PROGRAM MEMORY |
| WORD 5    $\overline{\text{WORD 6}}$ | CHANGE REGION 2 IN SYSTEM PROGRAM MEMORY |
| $\overline{\text{WORD 5}}$    WORD 6 | CHANGE REGION 3 IN SYSTEM PROGRAM MEMORY |
| $\overline{\text{WORD 5}}$    $\overline{\text{WORD 6}}$ | CHANGE CODE FOR ACTIVATING A TOTAL CHANGE IN THE SIGNALLING SYSTEM |

*FIG.9C*

SYSTEM FOR OFF-THE-AIR REPROGRAMMING OF COMMUNICATION RECEIVERS

BACKGROUND OF THE INVENTION

This invention relates generally to the field of portable communication systems and in particular, to portable radio frequency receiver devices which contain reprogrammable memories capable of being selectively reprogrammed by received radio signals to alter the decoding and alerting characteristics of the receiver.

DESCRIPTION OF THE PRIOR ART

The design and application of personal communication receivers, including personal selective calling receivers or radio paging receivers, is one of the most rapidly changing areas in the communications industry. Over the past few years, the predominant code transmission schemes used to signal paging receiver devices have changed from sequential tone based schemes to formats based on multi-digit binary code words, and the services offered to the user have evolved from simple alert only and alert plus voice signalling to more complex multi-function alerting with visual read-out of numeric and alphanumeric data. In addition, the paging systems that support the operation of paging devices have grown from small on-site and one-city systems to very large wide area systems that can cover most of a state, or even an entire nation as evidenced by the nationwide paging systems used in Europe. Further, the coding systems used in binary based signalling systems have evolved very rapidly as shown by the recent proposed plans to increase the bit rate of the standard POCSAG code from 512 bits per second to 1200 bits per second. This proposal occurred only a few years after the POCSAG code was adopted as a standard.

The rapid pace of technological change in the paging industry has made the efficient operation of paging systems a very difficult task. Quite frequently, a paging system operator finds that the radio pagers that were purchased last year do not have all of the features provided by units purchased this year, or worse yet, the two sets of pagers require two different and sometimes incompatible signalling systems. As a result, many paging systems use a mixture of paging receivers and signalling schemes, and the system transmits a time multiplexed signalling pattern that might consist of a lengthy sequence of six tone sequential paging codes, followed by a lengthy sequence of POCSAG tone-only binary paging codes, followed by a sequence of numeric display signals transmitted in accordance with Motorola's Golay Sequential Code signalling format.

This mixture of code signalling formats, receiver device models, and device features causes operational problems in terms of system capacity, user queue time and system flexibility as well as increased costs and problems associated with repairing and maintaining a large number of different paging receiver models. It also makes it very difficult to add new features and enhancements to the system because they may not be compatible with the older units which cannot be thrown away or obsoleted because they represent a large monetary investment.

Some reprogramming capabilities have been provided for communication devices such as mobile radio telephones in that certain personalizing characteristics of the radio can be encoded in an electrically erasable PROM which can be field programmed. The radio unit is connected to some sort of field test fixture which overrides the internal commands to cause reprogramming of the information, generally in a specific reserved memory area. While such developments enable a much broader utilization of devices in communication systems, direct access to the device is required to enable any changes to be made. Such prior art developments fail to recognize that an ideal communications system would enable a transmission station to exercise complete control over all of the characteristics of the plurality of receiver devices to which it is capable of broadcasting. Since a large proportion of communications systems are one-way (i.e. paging systems), this would enable the central transmission station or terminal to control the total message throughput capability of the plurality of receivers operating in its system.

With the advent of an ever-increasing number of receiver units operating in communication systems, especially in congested metropolitan areas, it becomes imperative that the central transmission station for these message systems exhibit greater control over the capabilities of the plurality receivers to which it is transmitting. Thus, not only selective call address changes and other personalizing aspects of the receiver could be controlled, but even the decoding system under which the receiver operates might be controlled from the central transmission station.

One attempt to improve the efficiency and message throughput capability of communication systems, especially paging systems, was described in U.S. Pat. No. 4,518,961 entitled "Universal Paging Device With Power Conservation" issued to Davis, et al., which resolved a problem of diversifying the communication capability of radio receiver systems by disclosing a receiver which is capable of decoding any of a plurality of possible decoding schemes which might be broadcast from a central transmission station or terminal. While this constitutes an advance in the art of communication systems, it does not provide the type of central transmission station control over the operational capability of a receiver at which the present invention is directed.

A goal of the present invention is to solve some of the problems associated with the rapid changes taking place in the paging business by providing a system in which a receiver can be modified by over-the-air commands. In particular, the goal is to provide a system in which a receiver device can be totally reconfigured via over-the-air commands and data transmissions in terms of the signalling system it can decode and the features and options it can provide Further, the new selective call receiver design is flexible enough to provide for a total change of the signalling system and correspondingly the operating characteristics of all of the receivers operating within the system, as well as providing the means for changing the features and options in any subset of the selectable receiver units.

To maximize message throughput with the present invention, the transmission station or terminal would now have the capability of identifying individual receivers and then designating which coding system a receiver can receive. In this way, the transmission station operator by knowing the types of messages that are transmitted to various collections of receivers, can select the best coding system format mix for various users to maximize the throughput operation of his communication system.

An obvious advantage is that without disruption of normal message transmissions and without even any awareness on the part of the user, a terminal operator could change the coding system of the user's receiver to maximize the terminal throughput for the entire system. At the same time, the terminal operator can maintain the integrity and reliability of the communication system for that particular user. It is also perfectly clear that if a user would request a change, such as in the features and options for his receiver, that could be achieved by terminal commands very easily and economically.

Moreover, the present invention will enable the terminal operator to take advantage of the ever-increasing technological advances with respect to coding systems and the advancements particularly in digitally formatted communication systems. Rather than having thousands of receivers in the field with limited capability, as new technological aspects become available, the terminal operator could selectively address appropriate receivers and make whatever changes are necessary to update and maximize the communication message capability of the established communication system.

SUMMARY OF THE INVENTION

It is an object of the present invention to provide a communication system in which a receiver is capable of off-the-air reprogramming to alter its operational characteristics.

It is a further object of the present invention to provide a selective call communication system in which selected receivers may be reprogrammed to decode a completely different signalling system.

It is yet an additional object of the present invention to provide reprogrammable selective call receivers which are both selectively callable and further selectively reprogrammable.

A communication receiver is disclosed which can decode signals transmitted by radio frequency propogation. A programmable controller uses instructions in a reprogrammable memory to decode and process the signals, and to output the information contained in the signals in a useable form. The controller also responds to predetermined signals by decoding and processing information on new decoding and operating instructions, and stores the data in a temporary memory. Logic circuitry responds to subsequent predetermined signals to enable selective reprogramming of the reprogrammable memory to alter the decoding characteristics of the receiver. Thus, in one mode, the device acts as a conventional communications receiver. In a second mode, data transmitted from a remote terminal location to a selected receiver will be loaded into its temporary memory and subsequently transferred to the reprogrammable memory to achieve the alteration of the decoding and operational characteristics of the receiver.

In one embodiment of the present invention, the present or currently programmed message coding format is used to transmitt reprogramming data to provide altered characteristics or features for the operation of a receiver while retaining the present message coding format.

Another embodiment of this invention provides the receiver with the capability of receiving an entirely new coding format, temporarily storing and checking it for errors and, in response to a transmitted command, entirely replacing the former message decoding format with the new format.

BRIEF DESCRIPTION OF THE DRAWINGS

Features of the invention which are believed to be novel are set forth with particularity in the amended claims. The invention itself, however, together with its further objects and advantages thereof, may be best understood by reference to the following description when taken in conjunction with the accompanying drawings.

FIGS. 3A and 3B comprise descriptive diagrams showing how the POCSAG address code word format can be used to selectively address a given receiver and to effect changes in the selected receiver device FIG. 3C is a table listing that portion of the POCSAG address code word designated as function bits and their utilization in a receiver device employing the present invention to change information in the address code memory.

FIG. 8C is a table listing the GSC signalling codes that may be used to change the information relating to the addresses or features contained in the address code memory of an individual receiver device.

FIGS. 8D and 8E comprise descriptive diagrams of the GSC signalling sequence used to effect a change in the information in the address code memory of an addressed receiver unit.

FIG. 8F is a table listing the combinations of the GSC reserved words 1 and 2 used to effect changes in various regions of the address code memory shown in FIG. 4.

FIGS. 9A and 9B comprise descriptive diagrams of the GSC transmission sequence of reserved words 3 and 4, reserved words 5 and 6 and data blocks used to effect a change in the reprogrammable program memory of all units in a designated group.

FIG. 9C is a table listing the combinations of GSC reserved words 5 and 6 used to effect changes in various regions of the reprogrammable program memory shown in FIG. 6.

DESCRIPTION OF THE PREFERRED EMBODIMENT

For purposes of description of the preferred embodiment and ease of understanding of the present invention, it is convenient to choose the one-way selective call messaging communication system known as paging. In such a system, the central transmission station or terminal is normally capable of using several different signalling formats to transmit information to a large population of paging receivers. Depending on the signalling format, the transmission may consist of various address signals which activate a predetermined alerting device to indicate to a pager user that a message has been received, the transmission of numeric signals to indicate a telephone number or other encoded message to which pager user is to respond, or the transmission of alphanumeric messages so that unique messages may be sent to to an addressed receiver. Such transmissions may be directed to one or more receivers by individually or collectively addressing them. In many such systems, several different types of signalling systems are intermixed on a time multiplexed basis.

Figure 1A:
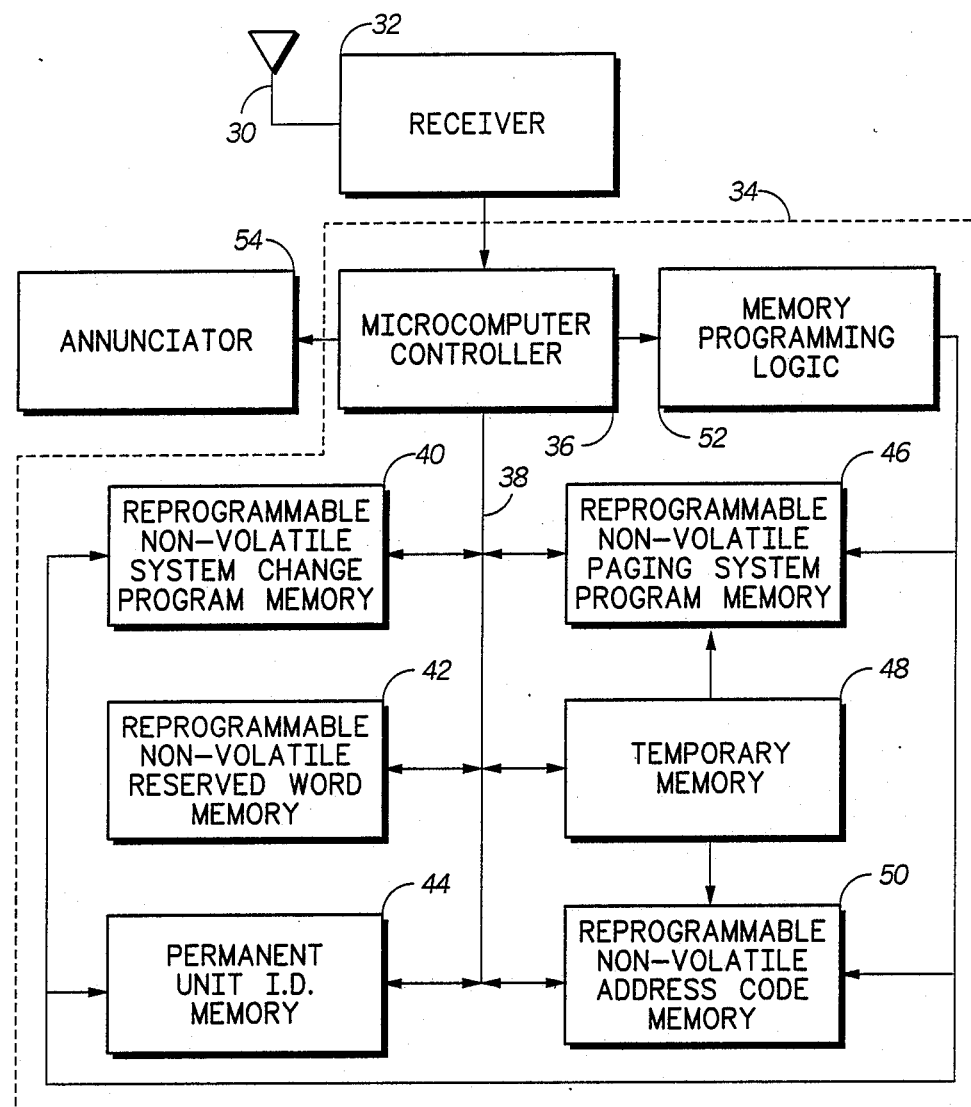
FIG. 1A is a functional block diagram of a receiver employing the present invention which is capable of being reprogrammed by signals received over a radio frequency communication link.

FIG. 1A is a functional block diagram of a receiver device employing the present invention. An antenna 30 is shown coupled to a receiver 32. Receiver 32 detects and demodulates signals transmitted from a remote location over a radio frequency communication link. In operation, receiver 32 may use any of a number of frequency tuning techniques including crystal channel elements or digitally synthesized frequency dividers and employ any of a number of modulation/demodulation formats including amplitude modulation or frequency modulation. For the purposes of the present invention, it is easiest to treat the receiver as a well known frequency (FM) modulated receiver which includes channel elements to accurately tune and detect frequency modulated information. However, any of a number of types of other receivers may be used for generating an appropriate detected RF signal for analysis.

The output of receiver 32 is coupled to an analysis and decoding system block 34 shown enclosed by broken lines. More particularly, the output of receiver 32 is coupled to an microcomputer controller 36. While the term microcomputer is utilized, it will be appreciated by those skilled in the art that a number of custom programmable logic circuits could be utilized to achieve the same controlling function as will be described in greater detail later. For purpose of describing the preferred embodiment, the implementation of the receiver device employing the invention will be by firmware stored in a memory portion of the microcomputer based controller. Microcomputer 36 includes a common bus line designated 38 which is used to couple it to a variety of additional devices. Any of a number of microcomputers would be suitable but a preferred device is a MC146805C4 or MC68HC11 microcomputer manufactured by Motorola, Inc.

In particular, microcomputer 36 is coupled through common bus line 38 to a reprogrammable non-volatile system change program memory 40, a reprogrammable non-volatile reserved word memory 42, a permanent receiver unit identification memory 44, a reprogrammable non-volatile receiver system program memory 46, a temporary memory 48, and a reprogrammable non-volatile address code memory 50. Microcomputer 36 is also coupled to a memory programming logic element 52 containing programming control logic which in turn is coupled to reprogrammable paging system program memory 46, reprogrammable address code memory 50, reprogrammable system change program memory 40, and reprogrammable reserved word memory 42. In addition, microcomputer 36 is coupled to an annunciator to generate an alerting sequence to inform the user upon receipt of a message. While the term annunciator is used, it is intended that such device may be audible, visual, tactile or any combination of such stimulus devices to inform the user of the receipt and/or content of the message.

The output of receiver 32 is coupled to microcomputer controller 36 which controls the overall decoding operation for whichever message encoding format is to be utilized at any given time. The function of the microcomputer controller 36 is to take the derived selective call message information from receiver 32 and process it according to a predetermined decoding format. Regardless of the encoding system, a microcomputer controller may be utilized as the main decoding tool. For the preferred embodiment, it is convenient to presume further that the receiver is an FSK receiver and the microcomputer controller is taking the derived binary digit levels from the discriminator output portion of the receiver and is processing them according to a predetermined digital word decoding format.

In normal operation, the microcomputer controller 36 is responsive to the information contained in reprogrammable non-volatile system program memory 46, and executes the signal decoding algorithms contained therein Memory 46 would contain all of the software information needed to allow the microcomputer to process and decode information encoded according to a predetermined signalling format. Reprogrammable non-volatile address code memory 50 is used to store the address code sequences that uniquely identify a receiving device and information to designate its characteristics and features, and reprogrammable non-volatile reserved word memory 42 is used to store address code sequences associated with a change in the address(es) or options of the individual unit, or in the signalling system. In operation, the microcomputer acts to compare received signal sequences with the sequences stored in memories 50 and 42 to determine if the selective call code signal(s) that address the individual unit have been received or if a system or unit change command has been received When a selective call signal is detected, the microcomputer controller will respond in the normal manner according to the information contained in address code memory 50 to activate annunciator 54 and alert the pager user that a message had been received This sequence of operation is well known in the art and indeed U.S. Pat. No. 4,518,961 describes such a microcomputer system.

When a system or unit change command signal is received, the microcomputer controller responds by storing the new data in the temporary memory 48 and then transferring the data to the appropriate non-volatile memory. Address code memory 50 is more commonly referred to as the code plug and such a device is included with most paging receivers to carry information as to the specific address or addresses of the selective call unit and may also contain such things as information determining the alerting sequence mode or other features that will be initiated upon the receipt and detection of an address of the individual unit. Temporary memory 48 is used to provide for the reliable reprogramming of the paging device. As will be discussed in greater detail later, memory programming logic device 52 under the control of microcomputer controller 36 is used for accessing the non-volatile memories 40, 42, 46, and 50 for the purpose of reprogramming then with data stored in temporary memory 48.

When predetermined sequences of the control signals contained in address code memory 50 and reserved word memory 42 are received, the microcomputer begins to execute the instructions contained in system change program memory 40 and acts to decode subsequent data transmission that define a new signalling format. The data is first stored in temporary memory 48 and is transferred into memories 40, 42, 46, and 50 after the correctness and completeness of the data has been verified. A permanent unit I.D. memory 44 is provided so that regardless of the status or utilization of any paging code format, the receiver always has an identifiable permanent address.

Upon receipt of predetermined reserved word signals which correspond to the information contained in reserved system word memory 42 and can be arbitrarily represented in any coding system, microcomputer controller 36 begins executing the program instructions contained in the system change program memory 40 to process subsequent data transmissions. This data, which is transmitted in the format of the paging code currently being broadcast, constitutes the new program instructions to be used to decode a new signalling format or new information for code memory 50. In this operating mode, the microcomputer controller 36 loads the received data into temporary memory 48, then checks the data for errors, and loads the data into the appropriate non-volatile memories. The data that represents the instructions for decoding the new signalling system are programmed into the paging system program memory 46, the data corresponding to the new system change instructions are programmed into the system change program memory 40, and the data corresponding to the new reserved word signals are programmed into the reserved word memory 42. Finally, the new address signal(s) for the unit are derived from the permanent unit I.D. memory using an algorithm contained in the transmitted data, and the new address signal(s) are programmed into address code memory 50. As will be described later, if only the information in code memory 50 affecting the address features or options of the device are to be reprogrammed, an algorithm need not be transmitted. Rather, the new information may be transmitted directly.

The reprogramming of the various non-volatile memories for the decoder is accomplished by means of the memory programming logic 52. In particular, the microcomputer controller 36 directs the memory programming logic to set up a specific memory for reprogramming and then sequentially inputs the data to the selected memory via the bus 38. The memory programming logic acts to enable the programming mode of the particular memory, and further prepares the memory to receive new data into a specified region of the memory map. The precise details of programming a non-volatile memory device, such as the EEPROM memory that is used in the preferred embodiment, are well known in the art and are not presented here.

While the operating system control word memory 42 is shown as a distinct memory, it is clear to those skilled in the art that it may be distributed in several locations, including paging system memory 46 and address code memory 50. Indeed, all of the memories shown in FIG. 1A could be physically incorporated into one memory device.

Before the activation of any change of paging code formats from one decoding system to another there must be some checking operation to ensure that the new information now stored in temporary memory 48 is free from errors. Once the microcomputer controller has determined that the received information is correct utilizing error correction techniques that will be described in detail later, it will cause a transfer of the information from the temporary memory 48 into the various reprogrammable memories, thus eliminating the past paging code format and replacing it with the new paging code format.

Figure 1B:
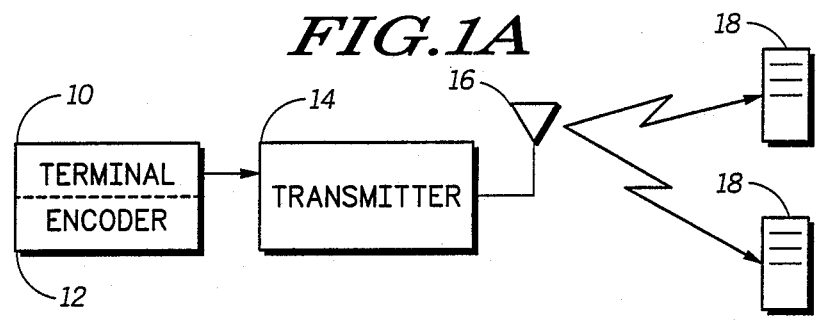
FIG. 1B is a functional block diagram of the system of the present invention.

FIG. 1B shows a functional block diagram of the operation of the present invention.

When the information to reprogram the receiver, device 18 is transmitted over the air by transmitter 14, an obvious concern is how one prevents transmission errors so that the receiver device can properly execute the desired reprogrammed procedures, and the new decoding procedures will operate correctly. Among the several well known ways of achieving this is to transmit the new programming information as encoded data and rely on the receiver device to employ some digital error correction algorithm and assume that the error corrected program data is correct. The programming information is encoded by encoder 12 which is part of terminal 10. There would be some limit on the maximum number of correctable errors, but this technique is widely used to achieve error-free data transmission. A second way is to transmit the new paging code format program several times while having the receiver device store the new data in the temporary memory. Transfer to the reprogrammed code information into paging system program memory 46 will occur only after it has been verified by a multiple receptions of identical data. A third method is to transmit the data several times with error correction algorithms and have the receiving device evaluate the received data and information and repeat the decoding process only for that portion of the transmission that appears to be in error. All of the three suggested error correcting are well known in the art (see, for example, "Error Control Techniques for Digital Communication", Arnold Michelson and Allen Levesque, 1985, John Wiley & Sons) and any of them may be used effectively.

The final step of the system change procedure outlined above involves the derivation of new address signal(s) from the permanent unit I.D. memory. Here, the information stored in the I.D. memory is processed in accordance with a transmitted algorithm to derive the address signal(s) assigned to that unit in the new signalling system. In the preferred embodiment, the unit I.D. information is stored as a binary sequence, and the algorithm used to derive the new address signal(s) is a binary transformation algorithm that might consist of multiplying the binary unit I.D. number by one or more binary sequences to obtain the new encoded address signals. The procedures for accomplishing such unit I.D. to signal code word transformation are well known in the art (see Chapter 4 of Michelson, et al., op. sit) and the mathematical details of the transformation procedure will not be presented.

Figures 2A, 2B, 2C:
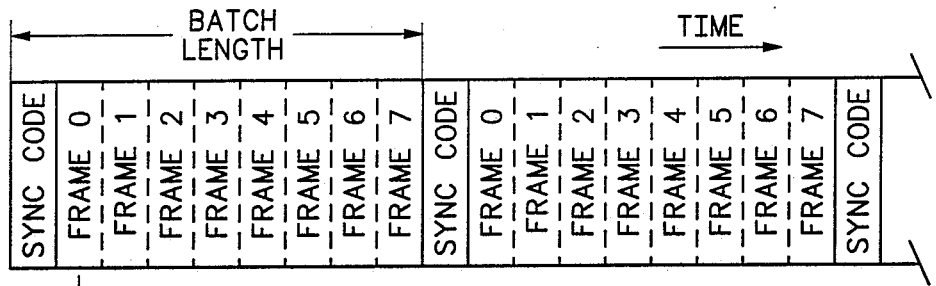
FIGS. 2A, 2B, and 2C comprise descriptive diagrams of the POCSAG signal coding format and code word structure that is widely used in the paging art.

FIGS. 2A, 2B, and 2C show the standard message coding format for the paging system commonly known as POCSAG. Each transmission is at a normal bit rate of 512 bits per second and consists of a preamble code portion (not shown) followed by one or more batches of selectively arranged code words in eight predetermined time slots called frames. The preamble code initiates the asynchronous operational sequence and is immediately followed by a synchronization code word. Each batch is delineated by a synchronization code word, and the information in all batches following the first synchronization code word is transmitted synchronously. Each code word is a 32 bit data sequence which contains information for synchronization, for addressing an individual pager, or for transmitting data to an addressed pager.

As shown in FIG. 2A, each batch of information begins with a 32 bit synchronization code word which is an invariant predetermined binary sequence. A batch that contains only address signals comprises a synchronization code word and sixteen address code words which are subdivided into the eight separate time sequence frames containing two address code words each. Subsequent address batches contain the same format of a 32 bit synchronization word followed by a total of 16 address code words.

The address code words are grouped into eight frames numbered 0 to 7, and correspondingly, the entire pager address population is similarly divided into eight possible groups. Each pager address is allocated to one of the corresponding eight synchronous time frames according to the three least significant bits of its entire 21 bit address identity. Thus, all pagers having a unique address code word which ends in 000 would be positioned in frame 0, and similarly, all pagers having a unique address code word ending in 111 would be in frame 7.

Address code words in the present format have a 32 bit structure and bit position 1 of an address code word is always 0 as shown in FIG. 2B. Bit position 1 of a data or message word is always 1 as shown in FIG. 2C. Bit positions 2-19 are the address information bits corresponding to the 18 most significant bits of the 21 bit address identity sequence assigned to an individual POCSAG pager unit. The three least significant bits are not transmitted since they merely serve to define the time frame in which the address code word must be transmitted and are therefore derivable from the frame position in a batch. Bit positions 20 and 21 comprise two function bits which are used to select one function from the four possible functions assigned to the pager and would normally be used to activate different alerting sequences to the user. Bit positions 22 to 31 are parity check bits that are derived from the (31,21) BCH code format used to derive the POCSAG codewords, and the final bit position 32, is chosen to have a value that gives even parity for the entire code word. The individual receiver devices in the POCSAG system will only examine address code words in a designated time frame, and therefore, each pager's address code words must be transmitted in the specific time frame that is allocated to that unit. The pagers are sometimes referred to as being in groups which correspond to the frame designation.

Each code word, whether a synchronization code word or an address code word or message code word, follows the same 32 bit format in which the most significant bit is transmitted first. The structure of a message code word is shown in FIG. 2C. Message code words have 20 message bits, bit 2 to bit 21 inclusive, and these are followed by parity check bit patterns similar to those used for address code words. A message code word always starts with a 1, and the whole message always follows directly after the address code word that directs the message to a particular unit. The framing rules of the code format do not apply to message code words which occupy consecutive address positions until the message is completed and the next address code word is transmitted. Each message displaces at least one address code word or idle code word, and the displaced address code words are delayed and transmitted in the next available appropriate frame. Although message code words may continue into the next batch, the normal batch structure is maintained, i.e., the batch will consist of 16 code words, preceded by a synchronization code word. At the conclusion of a message, the transmission of address signals is resumed.

In the absence of an address code word or message code word, an idle code word is transmitted. The idle code word is a valid address code word, which must not be allocated to pagers. It, like the synchronization code word, is an example of another reserved word in POCSAG. The 21 bit binary sequence used for pager identity in this coding system allows for two million combinations of possible addresses for pagers.

FIGS. 3A and 3B, along with FIG. 3C, are descriptive diagrams that show how the present invention can be used in conjunction with the POCSAG system. Specifically FIG. 3A shows two batches of POCSAG code words. In frame 3 of the first batch, the address of an individual pager is shown followed immediately by the data 60 for features, options or perhaps address changes to the information contained in address code memory 50. This information may encompass the remainder of frame 3, frame 4, frame 5, frame 6, and a portion of frame 7 as shown generally. While it may be appreciated that changing to another decoding system would occupy perhaps more time than the frame positions for 4 through 7, what is shown is a less extensive change for the purpose of illustrating the transmission of information to an individual receiver device to alter information in its code memory.

In normal operation, at the conclusion of frame 7, the sync code would be retransmitted so that all POCSAG pagers could maintain frame and bit synchronization. With the appropriate identification of a one in the first bit or message flag position of a POCSAG word, the data messages to an already addressed pager may be continued even beyond the synchronization word and into the frame 0 position subsequent to the sync code, shown by reference numeral 62 in FIG. 3A.

FIG. 3B shows the unique address code word which is sent in frame position 3 to address the individual pager and is identical in structure to the standard word format shown in FIG. 2B. Its position now in frame 3 is to indicate that an individual pager in frame or group 3 is being addressed.

FIG. 3C is a table showing that the normal function bits (bit positions 20 and 21) in the standard POCSAG address code word may be utilized to provide either normal selective calling operation or to designate that a sequence is being initiated at the terminal to alter the programmed features, options or address(es) of the individual receiver and to activate the procedures for changing a characteristic of the addressed unit. In particular, function bits 00, 01, and 10 may be utilized in their normal fashion to achieve various distinctive alerts which has been described as the generation of an annunciator signal pattern to designate to the receiver carrier that he has been addressed on a different address. For a numeric display or alphanumeric display pager, these function bits may cause the display of additional information along with an annunciation signal pattern to designate that a different message has been received.

For the purposes of understanding the operation of the present invention, the function bits 11 are designated as the appropriate code to condition an individual page to receive the re-programming sequence from the terminal to activate a change in the features, options or address information in the code memory using the present POCSAG signalling system. The advantage of a receiver device employing the present invention is that the pager user need have no knowledge that a change is occurring and that it is not necessary for him to intervene in any way. Rather, the terminal takes complete control of the reprogramming operation including the encoding of the information to effect the reprogramming of the pager. Thus, whenever a pager receives its normal address but with function bits designated as 11, the pager will be conditioned for the change.

Figures 3D, 3E:
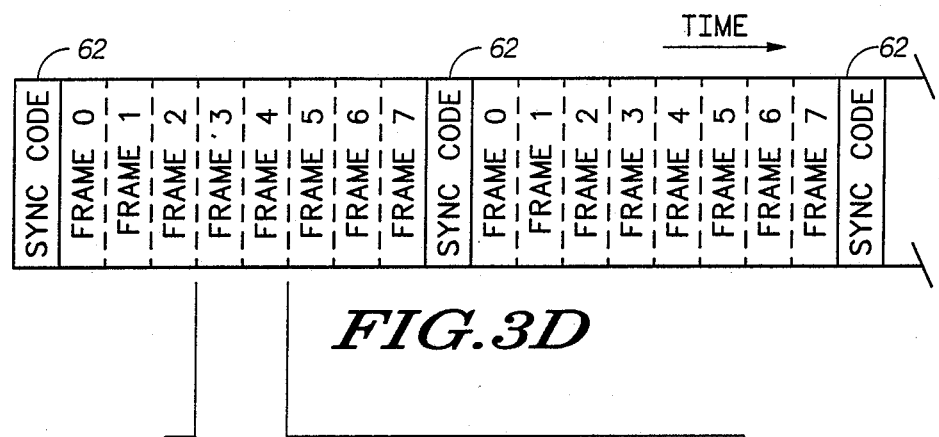
FIGS. 3D and 3E show descriptive diagrams of the POCSAG code word and data transmission sequence for reprogramming the address code memory in an individual unit.

FIGS. 3A, B, and C as have been described show the transmission of information to an individual pager for the purpose of changing the features, options, or address information contained in the code memory. FIG. 3D is a repetition of FIG. 3A to show timing sequence correspondence for FIG. 3E. It will be appreciated by those skilled in the art that there is some small probability for falsing on a unique address transmission which could lead to an incorrect determination that it is the intention that the terminal is to change information in the address code memory. The unique address bit information, in combination with the appropriate function bits, serves only to enable the decoder to look for an immediately subsequently transmitted reserved POCSAG code word 1. The detection of this reserved POCSAG code word 1 will activate the procedure for receiving new features, options and/or data, and for subsequently overwriting the information that is contained in the address code memory. As shown in FIG. 3E, the code plug change data is transmitted immediately subsequent to the reserve POCSAG code word number 1. This new information will be stored in temporary memory 48 under the control of the microcomputer controller 36. The reserve POCSAG code word number 1 has a format similar to the sync code and other reserved words in the POCSAG code system, which is a unique combination of bit sequences not otherwise used for addresses in the system.

Figures 3F, 4:
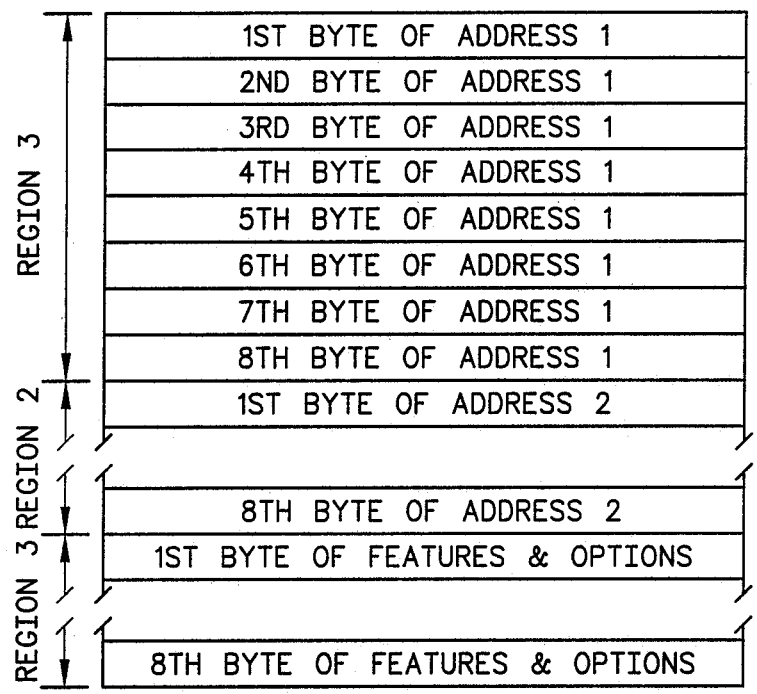
FIG. 3F is a table of the function bit portion of the POCSAG reserved code word #1 of FIG. 3E and its utilization in a receiver device employing the present invention.
FIG. 4 is a map of the reprogrammable address memory showing the correlation between the function bit table of FIG. 3F and the addressable memory regions in the code memory.

FIG. 3F shows that the function bit portion of the transmitted reserved POCSAG code word 1 may be used to designate which of several regions in the address code memory are to be overwritten with the appropriately transmitted data. Thus, the individual unit is addressed in a normal fashion with a function bit code designated 11 to indicate that the unit should look for the confirmation of a transmitter intended information change. Subsequently, the transmission of a reserved POCSAG code word 1 with the appropriate function bit information to designate the address code word memory region for change will then indicate in which region the information is to be changed. This is then followed by the data which is to replace information in the designated region of the code memory. FIG. 3F shows in particular that function bits 00 in reserve POCSAG code word 1 are used to indicate that no change is to be made while the other combinations of the function bits designate specific regions in the code plug which are to be overwritten with the subsequent data.

It will be appreciated by those skilled in the art that although the sequence for changing an individual unit has been shown, it would not be necessary to address each individual unit to change the information in its code memory and that larger numbers of units may be changed simultaneously. As, for example, units may be designed with a common address such that addressing an entire group of pagers such as within a designated frame would be enabled by the appropriate function bits and followed by the appropriate reserved POCSAG code word to effect changing the information in code memory of more than one unit at a time. It should also be clear that additional reserved words may be utilized to address all pagers and the repetition of such additional reserved code words in all frames would enable the entire population in the POCSAG system to be changed simultaneously. Moreover, the number of regions capable of being designated is not limited to three as more than two bits of reserved POCSAG words may be used to designate regions. Although what has been shown in FIGS. 3A-F applies to reprogrammed changes in the code memory 50, as will be shown in greater detail later the inclusion of a different POCSAG reserved code word will allow a reprogramming of paging system program memory 52 for the same individual unit. Thus, the same procedure of identifying an individual unit and employing the correct reserved code word will enable the central terminal to control the decoding characteristics of communication received by over-the-air reprogramming.

FIG. 4 shows in symbolic form the memory map of reprogrammable non-volatile address code memory 50. Code memory 50 is shown to be subdivided into several regions. While only three such regions are shown, it will be appreciated that any number of such regions may be utilized with appropriate coding in the reserved code word to designate them. The structure of each region of the the memory is shown to be eight serial locations, each capable of storing one byte of information. This structure is shown for the sake of convenience and it should be clear that any standard architecture of programmable memory would be appropriate to utilize for the present invention. Region 1 contains the various binary sequences of the first address code, region 2 is the second address code, and region 3 contains, again in binary sequence form, information related to the features and options of the paging receiver which are designated by information in the address code memory. It will also be appreciated that the information stored at the sequential locations in the regions can be of longer length than one byte and that this description is only by way of example.

The microcomputer controller 36, responds to the bit patterns stored in region 3 of the address code memory to activate or de-activate features and options contained in the program memory 46. For example, a receiver operating in the POCSAG signalling system may be limited to alerting to only one function by the data stored in the features and options section of the code memory.

A detailed memory map of the reprogrammable non-volatile reserved word memory, 42, is not shown. It is very similar to the address code memory shown in FIG. 4, and it will be obvious to those skilled in the art how this memory might be subdivided into regions.

Figures 5A, 5B, 5C:
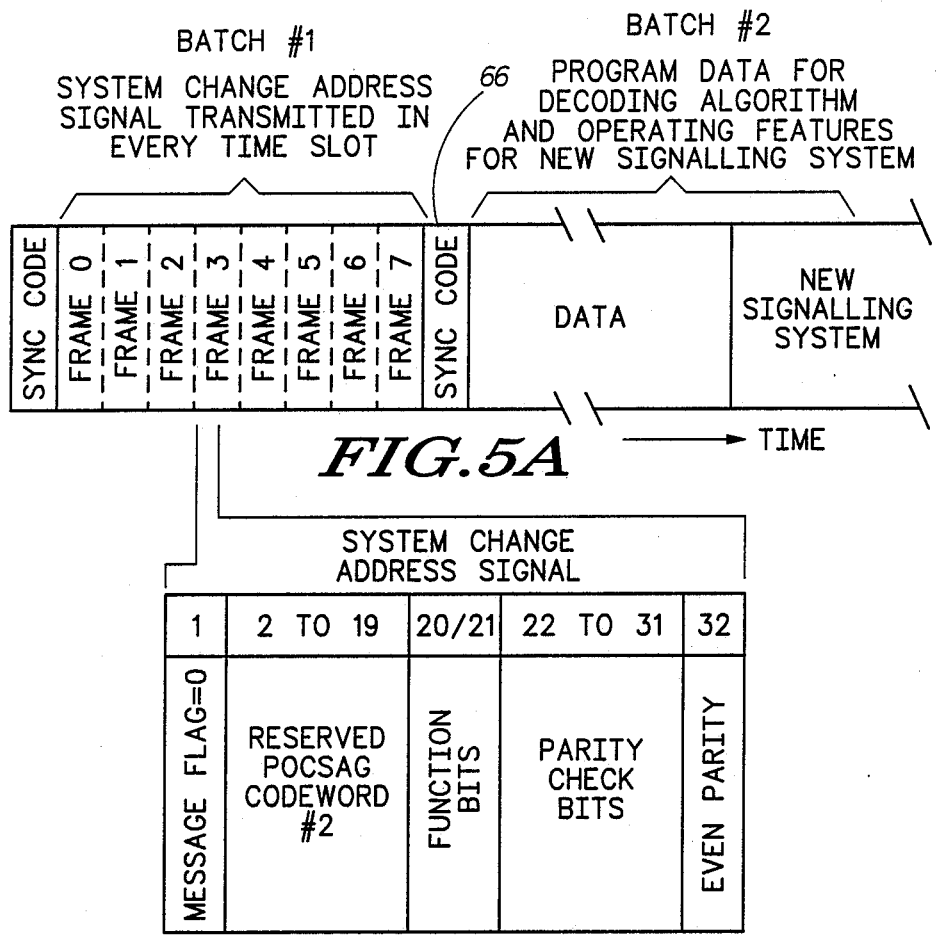
FIGS. 5A and 5B comprise descriptive diagrams showing a transmission of reserved POCSAG code word #2 followed by data words to a population of receivers to alter the coding system of the entire addressed population.
FIG. 5C is a table listing of the functions assigned to the function bit patterns of reserved code word #2 shown in FIG. 5B for changing information in reprogrammable program memory.

FIG. 5A shows the transmission sequence for two or more batches of information suitable for changing the decoding system used by a designated group or the entire population of POCSAG pagers. In particular, FIG. 5A shows that all pagers are addressed by the transmission of reserved POCSAG code word number 2 in all time slots, frames 0 through 7, to condition every unit to respond to the change. The use of reserved POCSAG code word number 2 in every frame signals the entire population of pagers to effect a change of all POCSAG pagers in one operation. It will also be clear that subsets of the entire population of pagers could be addressed to change their decoding algorithm by transmitting the system change signal in selected frames.

Subsequent to the second sync code shown as 66 in FIG. 5A, the program data for altering the paging system decoding algorithms, for inserting new algorithms for a new coding system, or for altering the features of the present system is transmitted and subsequently received by the addressed receivers. FIG. 5B shows the general arrangement of the reserved POCSAG code word number 2 utilized to actuate the change in system. It should be noted that reserved POCSAG code word number 2 has a leading bit "0" so that it is to be interpreted as an address code word. This is similar in structure to reserved POCSAG code word number 1 shown in FIG. 3E.

FIG. 5C now shows how the function bits for reserved word number 2 for changing the signalling code for POCSAG are used in a manner similar to that shown in FIG. 3F for the reserved code word 1 for changing the code memory command. FIG. 5C shows the standard POCSAG structure for reserved POCSAG code word number 2 of FIG. 5B but with the indicated function bits being used to direct the data to cause changes in designated regions in the system program memory 46. Specifically, function bits 00, 01, and 10 change designated regions in the program memory. Thus, portions of the POCSAG algorithms in this case may be modified by selectively reprogramming various regions, as for example, new alert sequences including unique displays could be established, provisions for decoding multiple addresses could be established for the purpose of creating new groups, new bit rate timing could be established for faster transmission of information, and other similar changes. Function bits 11 as shown in FIG. 5C are used to indicate that the entire code signalling system, that is, the entire POCSAG decoding algorithm system, is to be changed.

Figure 5D:
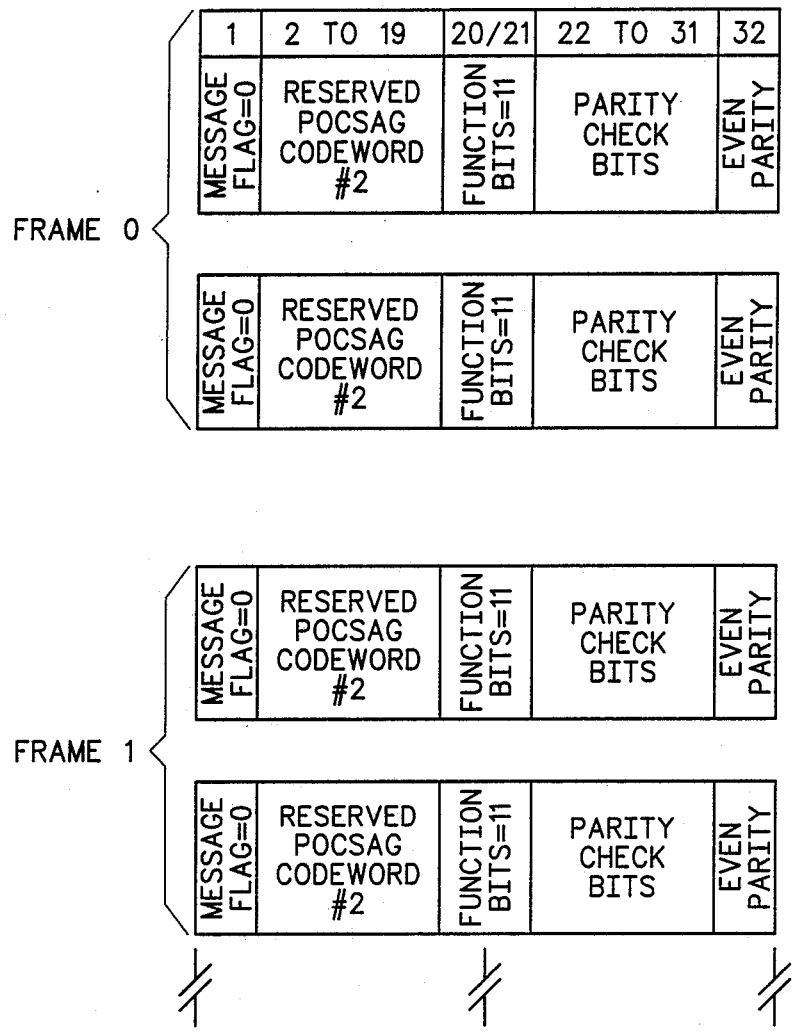
FIG. 5D comprises a descriptive diagram showing the POCSAG reserved code word #2 structure signal transmission for batch #1 of FIG. 5A for initiating a change of the signalling system.
Figure 5E:
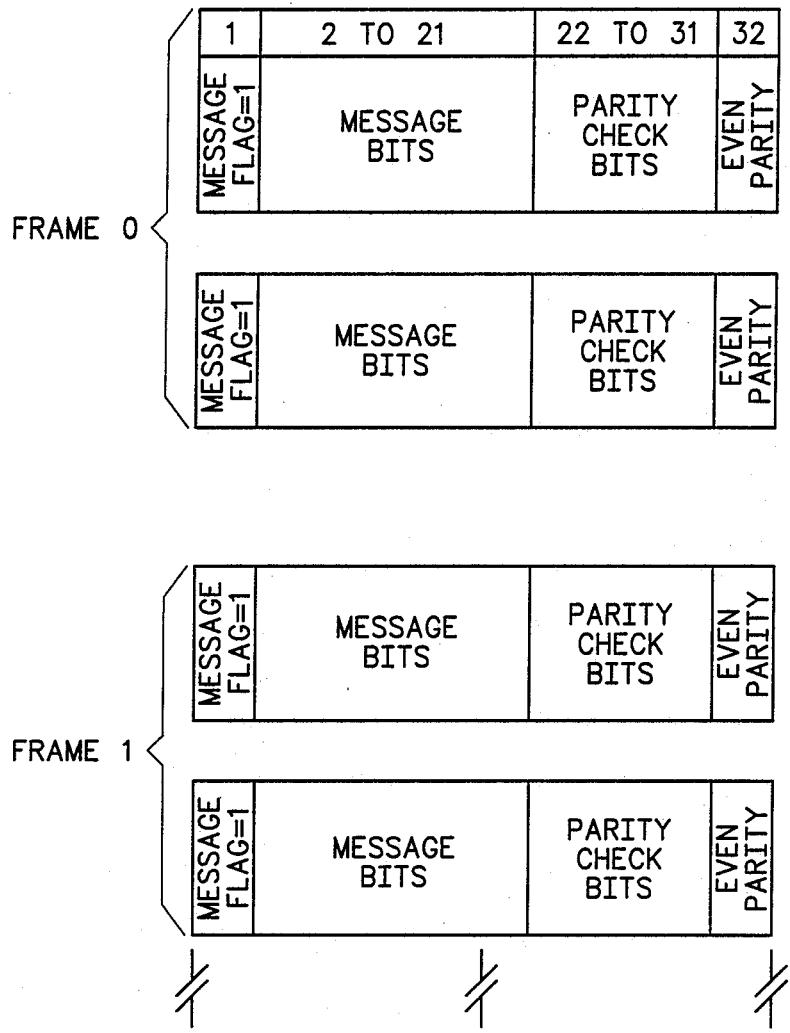
FIG. 5E comprises a descriptive diagram showing the message code word structure signal transmissions for batch #2 of FIG. 5A for effecting a change of the signalling system.

FIGS. 5D and 5E show in detailed form the structure of the code words which are transmitted in the frames to achieve changes in the system program memory 46. In particular, FIG. 5D shows that the first batch as indicated in the frame 0 portion of FIG. 5A includes two repetitions of reserved POCSAG code word number 2. For purposes of illustration, both reserve code words have function bits designated as 11 to indicate to all POCSAG pagers having their addresses in the 0 frame that an entire system change is about to occur. If it is an intention to change the entire population of POCSAG pagers to some modified coding system as shown, FIG. 5D would then include the repetition of two POCSAG reserve code word number 2 in each of the remainder of the frames of the batch. Thus, the entire population is addressed to respond to this change.

FIG. 5E shows the second batch transmission shown in FIG. 5A in a more detailed form. Following the second sync code designated 66, all of the data necessary to cause the pager to decode a new coding system is transmitted in batch form in the format of POCSAG data words shown and described in FIG. 2C. At the conclusion of the last transmission of reserve POCSAG code word number 2, and immediately following the sync code word, all pagers are prepared to decode the data transmission since each has been appropriately addressed by reserved POCSAG code word number 2 and will continue to stay up and detect information as long as the message data bit is a binary "1" to designate that it is data for an addressed unit.

Figure 6:
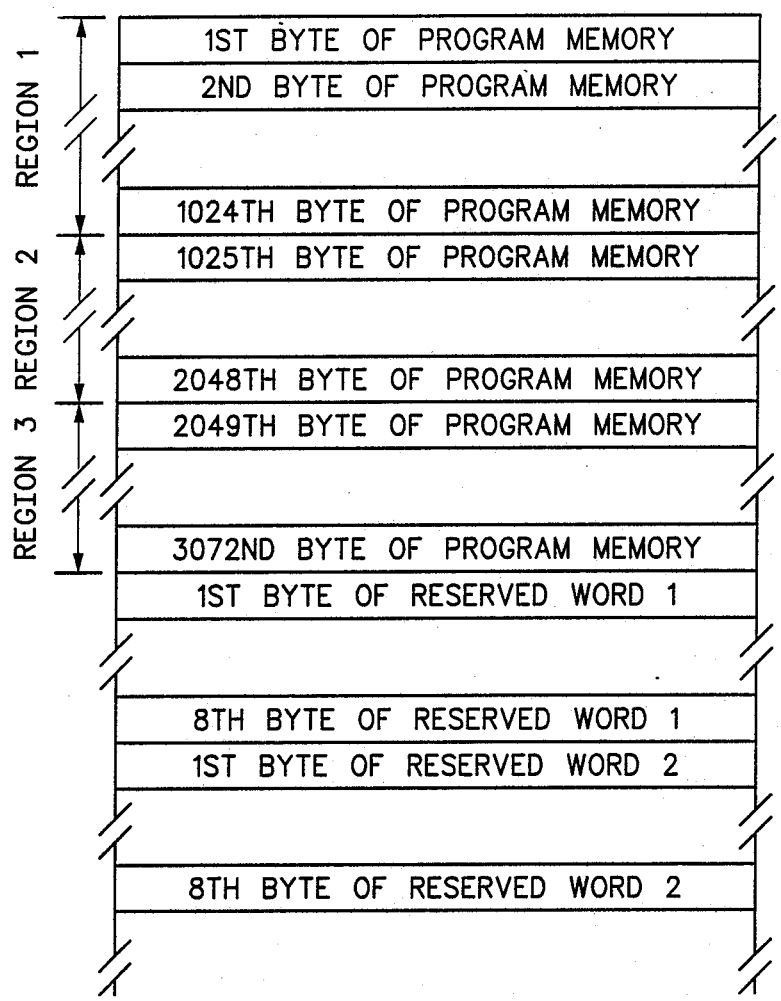
FIG. 6 is a map of the reprogrammable program memory showing the correlation between the table of FIG. 5C and the addressable memory regions.

FIG. 6 shows in schematic form the architecture or structure of system code memory 46. In a manner similar to code memory 50 shown in FIG. 4, at least three regions have been designated, although it should be clear to those skilled in the art that more regions could easily be designated. Each region shown in FIG. 6 consists of 1,024 sequential bytes of program memory information. The regions are contiguous and continue the sequence of the information so that region 2 begins at the 1,025th byte of program memory and extends to the 2,048th byte. Region 3 similarly begins at the 2,049th byte of program memory and extends to the 3,072nd byte. Again, as a matter of an example, 3,072 bytes of program memory are deemed to be a sufficient allocation of memory locations to enable an entire system program for decoding transmitted information to be stored. It will be appreciated by those skilled in the art that any number of regions of system program memory may be utilized and that any architecture of the memory including directly addressable locations combined with address pointers may be used for storing and retaining program information for the decoding of transmitted information.

Figure 7A:
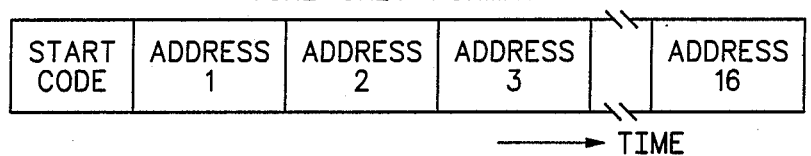
FIGS. 7A and 7B comprise descriptive diagrams of the message transmission format used in the Golay Sequential Code.
Figure 7B:
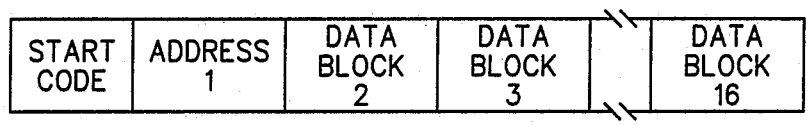

FIGS. 7A, B, C and D show a binary message paging system developed by Motorola, Inc. and commonly known as the Golay Sequential Code, which normally transmits address information at 300 bits per second and employs two sequential binary words for each pager address. The format consists of selective call address signals followed by data or information for the addressed units. A word for this system has a (23,12) bit format and is derived from a BCH code. The logic convention used in this system requires that binary logic 1 correspond to the most positive voltage and that binary logic 0 correspond to the most negative voltage. In particular, FIG. 7A shows a transmission sequence of a start code followed by a sequence of sixteen individual pager addresses which constitute a batch. This sequence is especially important to tone only operation. FIG. 7B shows another batch but now an individual address is immediately followed by various data blocks which would be appropriate for numeric or alphanumeric information transmission.

Figure 7C:
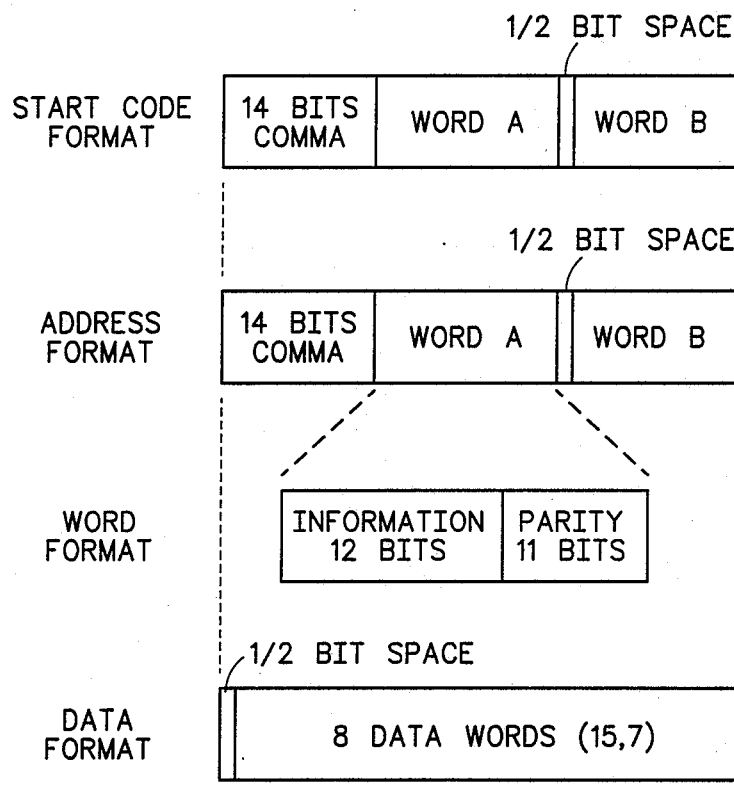
FIG. 7C is a descriptive diagram showing the structure of the several types of Golay Sequential Code (GSC) signals.

Referring now to FIG. 7C, each paging address in the Golay sequential system consists of two 23 bit binary words separated by a one-half bit interval and preceded by a 14 bit duration of a signal designated as a comma. The first and second words are generally designated as Word A and Word B. Two 23 bit paging address words which follow each other serially constitute the address code signal of a pager. The comma or pause interval of a specified duration is transmitted between each pair of 23 bit word address to form an inter-address gap.

The code word format of this dual-word addressing system is generated from 12 information bits, and the combination of the information plus parity bits comprises the 23 bit word length. As is well known in the digital signalling art, parity bits are added to information bits prior to transmission over a channel to allow some errors to occur and yet still ensure that one word will not be mistaken for another word. It is the convention in the G.S.C. system that the logic level of the one-half bit space between sequential address words is always opposite the logic level of the first bit of the second word in the two word address series.

The use of 12 bits to define a G.S.C. code word allows for 4,096 unique combinations, and adding a second word to additionally specify the address code signal would ordinarily result in nearly 17 million unique pager addresses. However, one method for decoding Golay message systems operates asynchronously while detecting the first word in each address sequence. As a result, the decoding apparatus is then sensitive to cyclical variations of the address code patterns resulting in possible false detections in the first word producing an incorrect identification of the pager address. To eliminate this problem, two serial address words that are cyclically related are normally not used as the first word of the two 23-bit word address system since this could lead to a probability of a false word A detection. It is possible to provide 178 different 23-bit binary words where each cyclic variation of any one would be different from any other of the 178 binary words or their cyclic variation by at least seven binary bits.

Figure 7D:
FIG. 7D is a descriptive diagram showing the relative bit timing for the various signal components of the GSC transmissions.
Figure 7D:
Figure 7D:
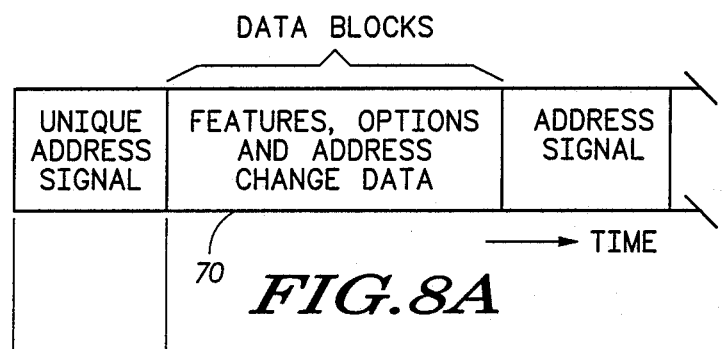

FIG. 7C also illustrates that the start code signal and the address code signals have the same transmission time as 8 GSC data words with this period being equal to 60.5 bits of the 300 bit per second address signalling rate. FIG. 7C further shows the detailed bit format of the data blocks which were shown in FIG. 7B. In particular, a different word format BCH (15,7) code is used to transmit data in the GSC system. FIG. 7D shows that the transmission bit rate is not always the same in the GSC system. While address word sequences are transmitted at a 300 bits/sec. rate, both comma and data blocks are transmitted at 600 bits/sec.

Figure 8A:
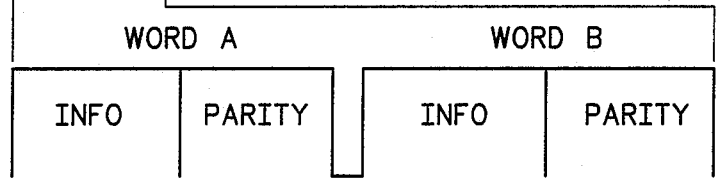
FIGS. 8A and 8B comprise descriptive diagrams of the GSC coding format as used for the transmission of information to an individual receiver device employing the present invention.
Figure 8B:
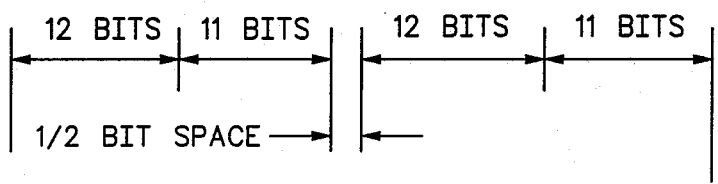

FIGS. 8A and 8B are descriptive diagrams showing the appropriate coding sequence within the Golay Sequential Code to address a given receiver device for the purpose of changing characteristics stored in its address code memory. These figures may be compared to FIGS. 3A and 3B for the POCSAG code. In particular, FIG. 8A shows the sequence comprising the unique addressing signal followed by instructions 70 in a data block sequence which will alter the features or options or initiate an address change. This address and data block information would normally be followed by additional addresses which may cause alerting of other pager units or may also be followed by similar signalling sequences to change the characteristics of other receiver units.

FIG. 8B shows an expanded view of the unique address signal comprising word A and word B that is characteristic of the Golay Sequential Code, and is identical to the address format that was described earlier in FIG. 7C. FIG. 8C shows a table listing how the various possible combinations of word A and word B of a unique address signalling code can be used to designate different functions for the Golay Sequential Code. Here, the fact that either a code word or it's binary inverse can be transmitted and detected is used to provide four functions per address. These are generally designated as word A, word B; word A, inverse word B; and inverse word A, word B which are to be used as normal, distinctive alerting functions. Now, however, the function activated by the detection of inverse word A combined with inverse word B is a reserved address that is used for conditioning the pager for a change in features, options or address. This is analogous to the use of 11 as function bits in an individual receiver address code word in the POCSAG system. FIGS. 8A–8C correspond generally to FIGS. 3A–3C for an individual pager in the POCSAG signalling system. In a manner analogous to the case for POCSAG, to confirm that it is the intention of the terminal to change the information in the address code memories of an individual pager or a group of pagers, a unique change confirmation signal is transmitted immediately after the address signals. In particular, a reserved pair of Golay words is transmitted to the pager(s) after it has been appropriately conditioned. This provides additional confirmation that a change is being transmitted, and reduces the change that a unit will be erroneously changed by the reception of a noisy signal.

As more clearly seen in FIG. 8D, the transmission by the terminal to an individual pager to change features, options, or address would be initiated by a start code, followed by the appropriate inverse words A and B to address the particular pager and condition it for the change, followed by the GSC reserved words 1 and 2 to confirm that the terminal is to make the change. This sequence is then followed by the data for the feature changes which is in the form of data blocks as described earlier.

FIG. 8E shows the code word sequence used to change the address code memory in greater detail. The inverse words A and B which condition the pager are preceded in normal fashion with a comma. This is then followed by comma and the two reserved GSC words to activate the changes in the code memory. Finally, in normal fashion, the information to make the change follows in data block format.

FIG. 8F shows that by using normal and inverted code word transmissions, the combination of GSC reserved words 1 and 2 can be used to determine which of the several regions in the address code memory will be altered. In particular, FIG. 8F shows that if reserved word 1 and reserved word 2 are transmitted normally, that is treated as an invalid command and no change is intended to be made. Reserved word 1 and inverse reserved word 2 is directed towards a change in region 1; inverse reserved word 1 and reserved word 2 is directed to a change in region 2 and inverse reserved word 1 and inverse reserved word 2 are directed towards region 3. Again, the similarities between the use of the described coding systems, that is between the Golay Sequential Code and the POCSAG code, to effect the change can be drawn. The reader's attention is directed to the similarity of FIG. 8F with FIG. 3F for directing changes to the appropriate regions in the address code memory. Continuing, with respect to FIG. 8F, the reserved word sequence indicates the region of the address code memory that is to be changed by the new data. The reader's attention is directed to FIG. 4 where the structure of the code memory was shown and described in detail.

FIG. 9A shows, in a manner similar to that shown in FIG. 5A for the POCSAG code, how the Golay Sequential code can be used to effect a decoding change in either an individual unit or a suitably grouped number up to all units in the entire population of paging receivers. In particular, FIG. 9A shows a transmission sequence that begins with a start code and is followed by Golay reserved words 3 and 4, indicating that it is the intention to change all of the Golay sequential units. Here, Golay reserved words 3 and 4 are used as a universal address or all call address for the entire population of GSC units. Reserved words 3 and 4 are similar in structure to GSC reserved words 1 and 2 used to designate specific regions of the code memory for change. Reserved words 3 and 4 function to activate all units to respond to the following system change information. So that no confusion should arise, reserved words 3 and 4 are merely used to indicate the common address for all units in Golay Sequential Code.

After all units have been appropriately addressed by reserved words 3 and 4, and thereby conditioned to respond to the system change sequence, GSC reserved words 5 and 6 are immediately transmitted to confirm that a correct system change is being initiated. The sense of the reserved words 5 and 6, i.e., "normal" or "binary inverse" also indicates which region of program memory is being changed. Reserved words 5 and 6 are immediately followed by the new programming information needed to change the operation of the units, which is transmitted in the format of the GSC data blocks described earlier. FIG. 9B shows the sequence of FIG. 9A in greater detail. In summary, GSC reserved words number 3 and number 4 are used as an all unit or entire population group call. It should be clear to those skilled in the art that if an individual or group address were included in this position instead of reserved words 3 and 4, that only that individual or group of pagers would be adressed and thus only the individual or group pagers which would undergo the entire system change.

The transmission of GSC reserved words 5 and 6, as has been stated, operates in a manner that is similar to reserved word 1 and 2 for the code memory and confirms that a valid change is being transmitted. The information necessary to implement the system change is the transmitted in the GSC data block format.

FIG. 9C shows, in a manner similar to FIG. 5C, how the possible sequences of GSC reserved words 5 and 6 are used to access various regions in the system program memory. In particular, the word 5 and word 6 combination is used to indicate a change in region 1; word 5 and inverse word 6, region 2; inverse word 5 and word 6, region 3; and inverse word 5 and inverse word 6 is the code for activating a total change in the signalling system. The regions as indicated in FIG. 9C are the same regions of system program memory 46 as were shown and described in detail for FIG. 6. The architecture of the system program memory 46, as described in FIG. 6, is the same and it is only the information which is stored in the program system memory which alters the operation of the pager.

Following the above descriptions of the decoder system and signalling systems, the operation of the present invention while in the POCSAG coding system can now be described. The POCSAG code format and transmission sequences were described in FIGS. 2A-C, 3A-F, and 5A-E. The operation of system decoding block 34 of the receiver device is best described by means of program flow charts. As illustrated in the combined flow chart of FIGS. 10A-D, the system is first initialized at block 302. Next, the code plug memory is read at block 304 and the information obtained is utilized to initialize the timer, as shown at block 306. A search for bit sync then commences as shown at block 308. If bit sync is not found, the search for bit sync is continued. If bit sync is found, then bit timing is established at block 310, after which the timeout timer is started at block 312 to establish a time period during which the sync word should be detected. During this time period, the system searches for the sync word, block 314. If the time period for locating the sync word expires without the sync word being found, block 316, then the search for bit sync is begun again. However, if the sync word is detected, then the system flow chart, through a continuation block designated A, proceeds to FIG. 10B.

Figure 10A:
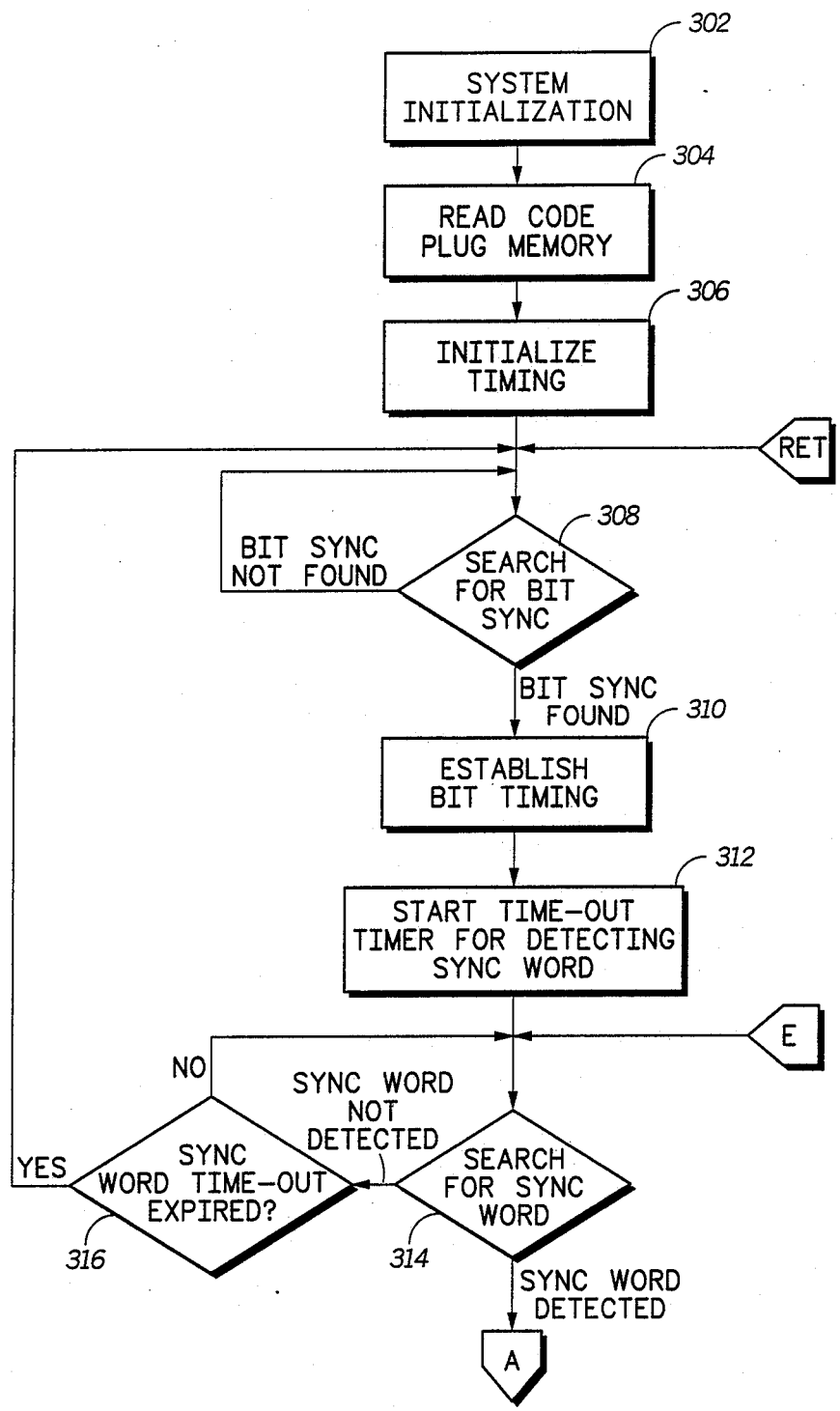
FIGS. 10A-E comprise a program flow chart showing the detection of POCSAG address code words and data words by a receiver employing the present invention including the logical branching to the appropriate portions of the flow chart based upon the detection of function bits, reserved words and program change data.
Figure 10B:
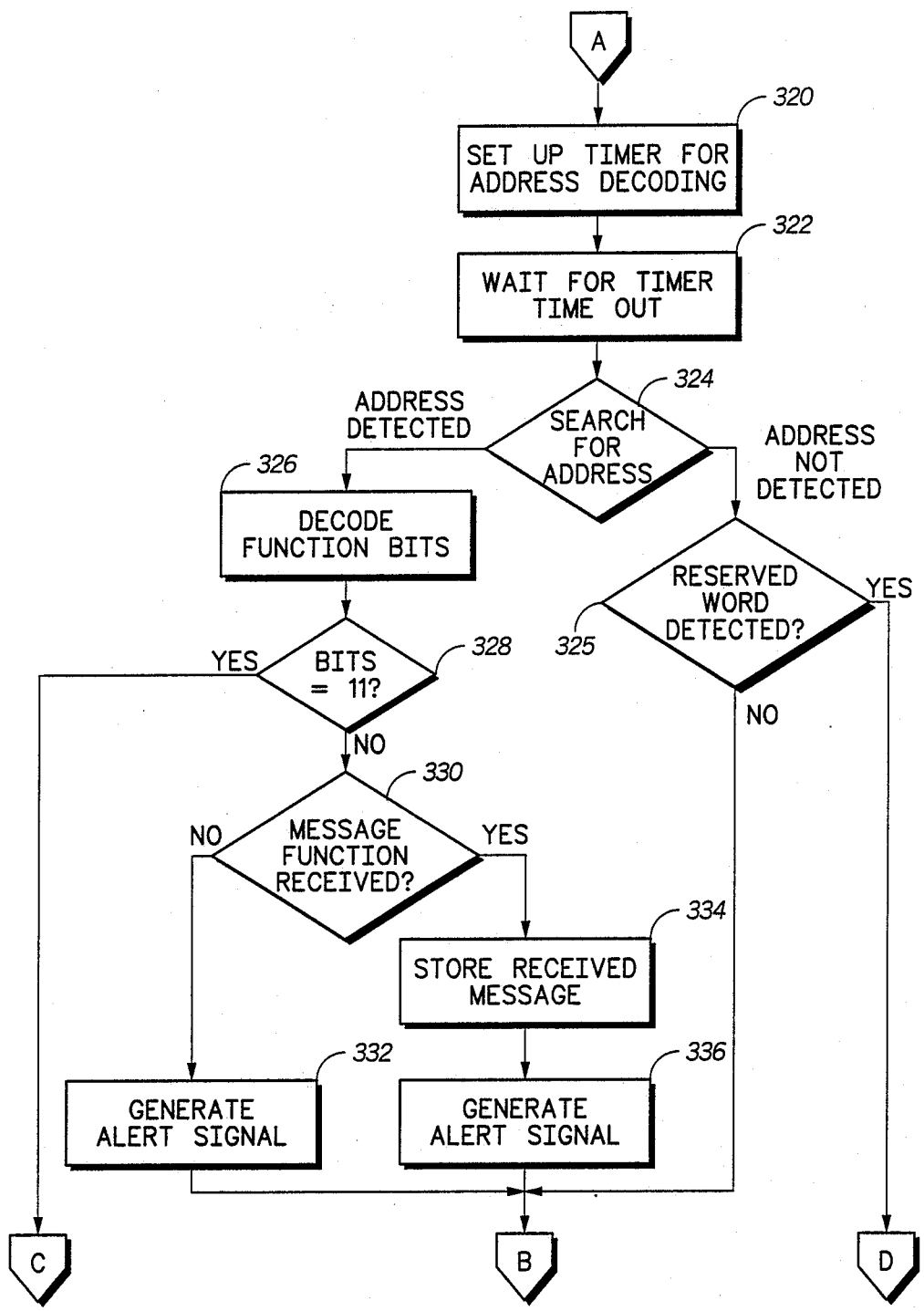

In FIG. 10B, after entry by continuation block A, the timer is set up for address decoding during the appropriate frame at block 320. A wait is made for timeout, block 322, after which a search is made for the address at block 324. If an address is not detected, a search is made to detect a reserved word at 325 and the program proceeds through a continuation block designated B. If the reserved word is detected, the program proceeds through continuation block D. If an address other than a reserved word is detected, then the function bits are decoded as per block 326. The function bits are first examined at 328 to determine if they are 11 to indicate conditioning to accept a change in the code memory. If the function bits are identified to be 11, the program proceeds through continuation block designated C. If the function bits are not 11, they are examined further to determine if a data message function or address was received as shown at block 330. If no data message function is present, then an alert signal is generated at block 332. However, if a message function is present, then the data message is stored in a message memory at block 334, after which an alert signal is generated at block 336. After the alert signal has been generated at either 332 or 336, the program proceeds through continuation block B.

Figure 10C:
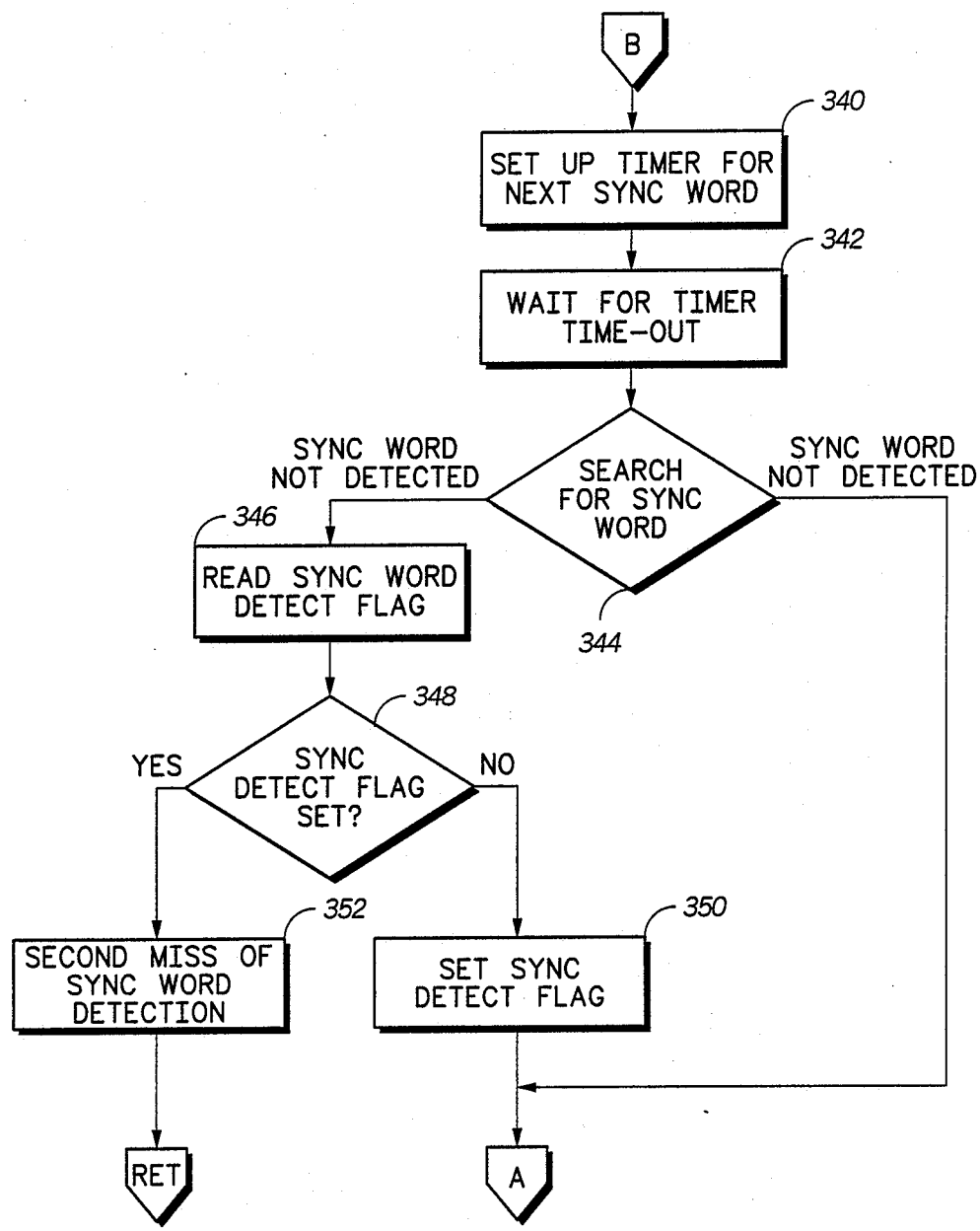

In FIG. 10C, after entry by continuation block B, a timer is set up for the next sync word at block 340. The system waits for a timer timeout at block 342, and a new search for a sync word is initiated at block 344. If the sync word is detected, then the program proceeds through continuation block A to 320 in FIG. 10B. If the sync word is not detected, a sync word detect flag is read at block 346 to enable a determination to be made whether or not the sync word detect flag is set at decision block 348. If the sync word detect flag is not set, then the flag is set at block 350 and the program returns through continuation block A to set up the timer for address decoding, block 320 in FIG. 10B. If the sync word detect flag was already set, the routine branches to second miss of sync word block 352 and proceeds through a return continuation block designated RET which causes the program to return to a search for bit sync 308 in FIG. 10A.

Figure 10D:
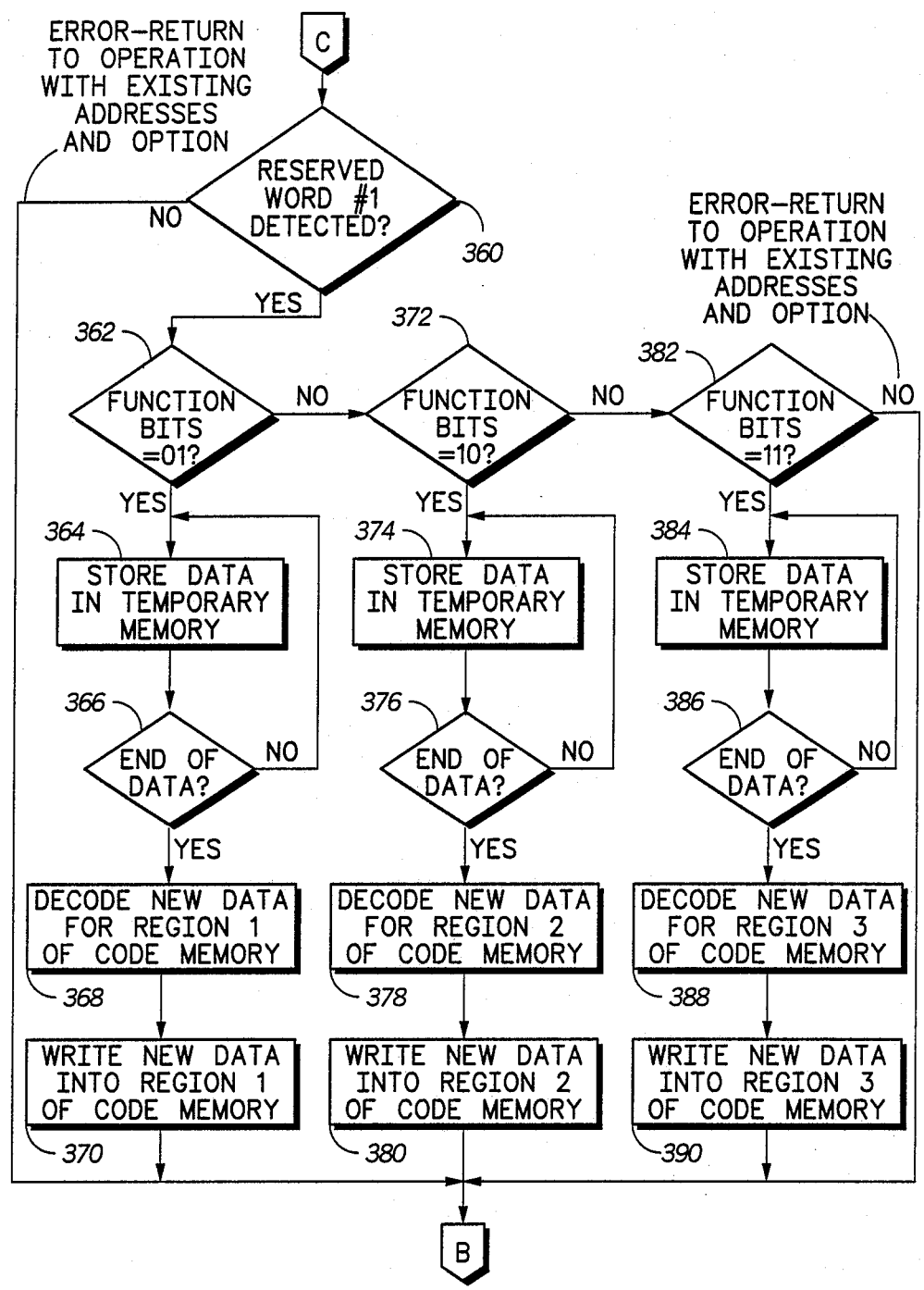

In FIG. 10D, after entry through continuation block C which indicates that an address signal with 11 function bits has been detected, the next code address is compared to determine if reserve word 1 has been detected at 360. If reserve word 1 has not been detected, then the program returns through continuation block B to set up the timer for the next sync word 340 in FIG. 10C. If reserve word 1 has been detected, its function bits are examined at 362 to determine if they are equal to the 01 bit combination. If the function bits are identified to be 01, then data is stored in the temporary memory at 364. A test is made for the end of data at 366. If the end of data has not been detected, data continues to be stored in temporary memory. When the end of data has been detected at 366, the process of decoding the new data for region 1 of the code memory begins at 368 followed by writing the new data into region 1 of the code memory at 370. After the new data is written into region 1, the program returns through continuation block B to set up the timer for the next sync word 340 in FIG. 10C.

If at decision block 362 the function bits do not equal the 01 combination, then the function bits are tested for the 10 combination at block 372. If the function bits do equal the 10 combination, then data is stored in temporary memory at 374 and a test for end of data is performed at 376. If no end of data is detected, information continues to be stored in memory. When the end of data is detected, new data is decoded for region 2 of the code memory at 378, followed by writing the new data into region 2 of the code memory at 380. After the new data is written into region 2, the program then continues through continuation block B to set up the timer for the sync word at block 340 in FIG. 10C.

If the function bits do not equal the 10 combination, the function bits are tested to determine if they equal the 11 combination at 382. If the function bits equal the 11 combination, program initiates storing data in temporary memory at 384, followed by the testing to determine the end of data at 386. If the end of data has not been detected, the program continues to store data in the temporary memory. Upon detection of the end of data, the new data is decoded for region 3 of the code memory at 388 and written into region 3 of the code memory at 390. The program then proceeds through continuation B to setting up the timer for the sync word 340 in FIG. 10C. If the test for function bits equal to the 11 combination shows that they are not detected, then by process of elimination, the function bits must equal the 00 combination and an error has been detected. The program continues to operate with the existing or unmodified address and options remaining in the code plug and returns through continuation point B to set up the timer for the next sync word at block 340 in FIG. 10C.

Figure 10E:
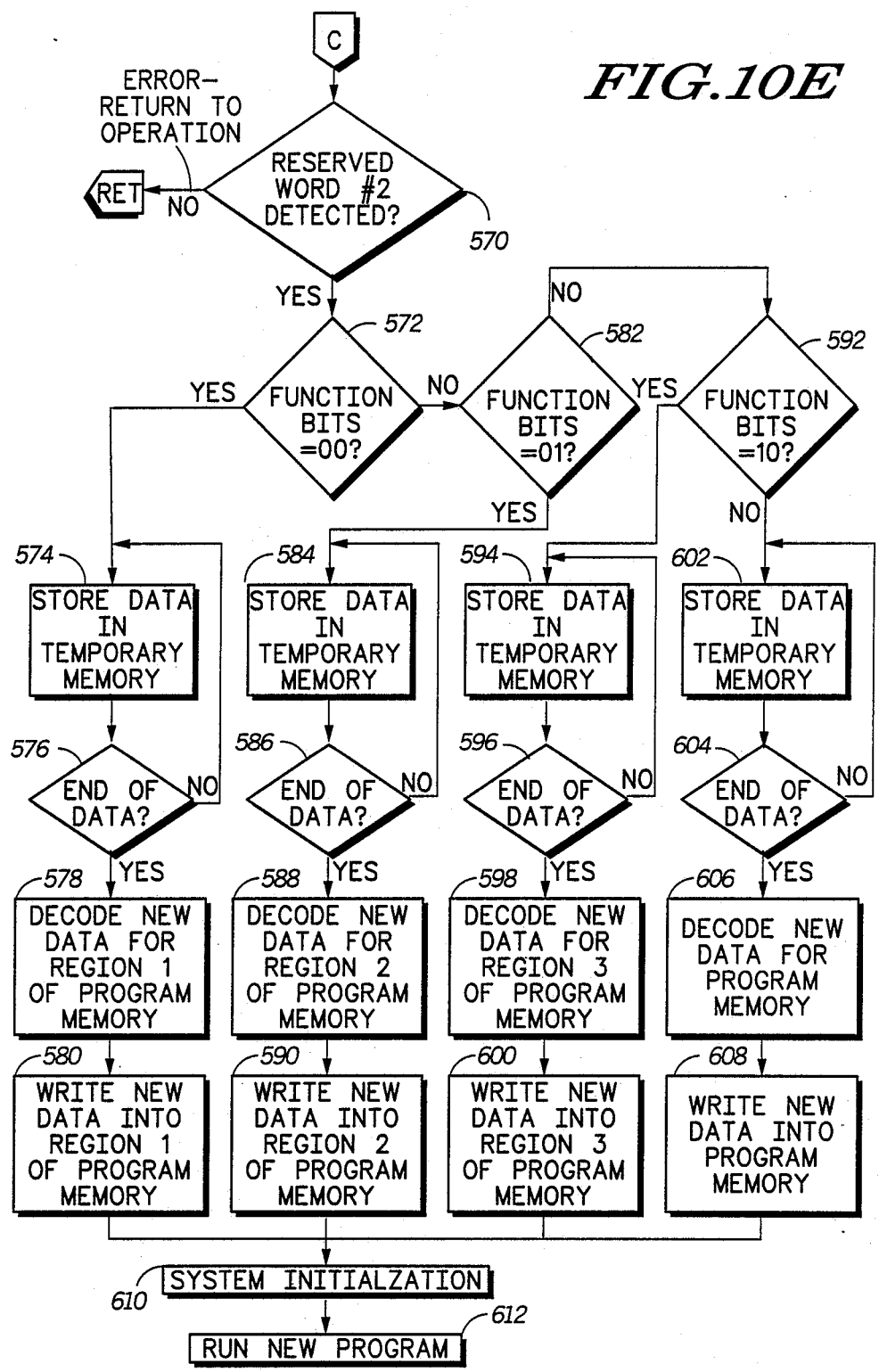

In FIG. 10E, after entry through continuation block D which indicates that a reserved address signal has been detected, the detected code address is compared to determine if reserve word 2 has been detected at 570. If reserve word 2 has not been detected, then the program returns through continuation block RET to search for bit sync at 308 in FIG. 10A. If reserve word 2 has been detected, its function bits are examined at 572 to determine if they are equal to the 00 bit combination. If the function bits are identified to be 00, then data is stored in the temporary memory at 574. A test is made for the end of data at 576. If the end of data has not been detected, data continues to be stored in temporary memory. When the end of data has been detected at 578, the process of decoding the new data for region 1 of the program memory begins at 578 followed by writing the new data into region 1 of the program memory at 580.

If at decision block 572 the function bits do not equal the 00 combination, then the function bits are tested for the 01 combination at block 582. If the function bits do equal the 01 combination, then data is stored in temporary memory at 584 and a test for end of data is performed at 586. If no end of data is detected, information continues to be stored in memory. When the end of data is detected, new data is decoded for region 2 of the program memory at 588, followed by writing the new data into region 2 of the program memory at 590.

If the function bits do not equal the 01 combination, the function bits are tested to determine if they equal the 10 combination at 592. If the function bits equal the 10 combination, program initiates storing data in temporary memory at 594, followed by the testing to determine the end of data at 596. If the end of data has not been detected, the program continues to store data in the temporary memory. Upon detection of the end of data, the new data is decoded for region 3 of the program memory at 598 and written into region 3 of the program memory at 600.

If the test for function bits equal to the 10 combination shows that they are not detected, then by process of elimination, the function bits must equal the 00 combination. The program initiates storing data in temporary memory at 602, followed by the testing to determine the end of data at 604. If the end of data has not been detected, the program continues to store data in the temporary memory. Upon detection of the end of data, the new data is decoded for the entire program memory at 606 and written into the program memory at 608.

After the new data has been read into any or all of the program memory regions, a system initialization similar to 302 is actuated at 610 and the new program begins to run at 612.

To summarize, the flow charts shown in FIGS. 10A to E show how the present invention operates in the POCSAG coding system. The paging device operates like a conventional selective calling receiver in that it can provide all of the features and options associated with the POCSAG code. In addition, the device can be reprogrammed via POCSAG format signals received over-the-air to modify the features, options and/or address signal(s) assigned to the unit, or to modify the signalling system the unit will decode. That is, the unit can be totally reconfigured by the procedures shown in FIG. 10E to operate in any new coding system, including the Golay Sequential Code.

The operation of the present invention while in the Golay Sequential Code system can now be described. The GSC code format and transmission sequences were described in FIGS. 7A-D, 8A-F, and 9A-C. The operation of system decoding block 34 of the receiver device is best described by means of program flow charts. As illustrated in the flow chart of FIGS. 11A-E, the decoding system is first initialized at 402. Next, the code plug memory is read for address information at block 404. After the code plug is read, the timer is set up at block 406, after which the system waits for a time-out at block 408. After waiting for such time-out, the timer is restarted in block 410 and the address flag is set to address number 1 at block 412. Then, word 1 of the current address is loaded as seen at block 414. After loading word 1 of the current address, the program searches for word 1 in the received signal at decision block 416. If word 1 is not detected, then the program proceeds through a continuation block B to FIG. 11B. If word 1 is detected at block 416, then flow continues to decision block 418 where a determination is made whether word 1 or its inverse has been detected. If word 1 is detected, then a detect flag is set for word 1 for the current address at 420. If instead the inverse of word 1 was detected at 418, then a detect flag is set for inverse word 1 for the current address at 422. With the appropriate flag set for the detection of word 1 or its inverse, the program proceeds through continuation block A to FIG. 11B.

Figure 11A:
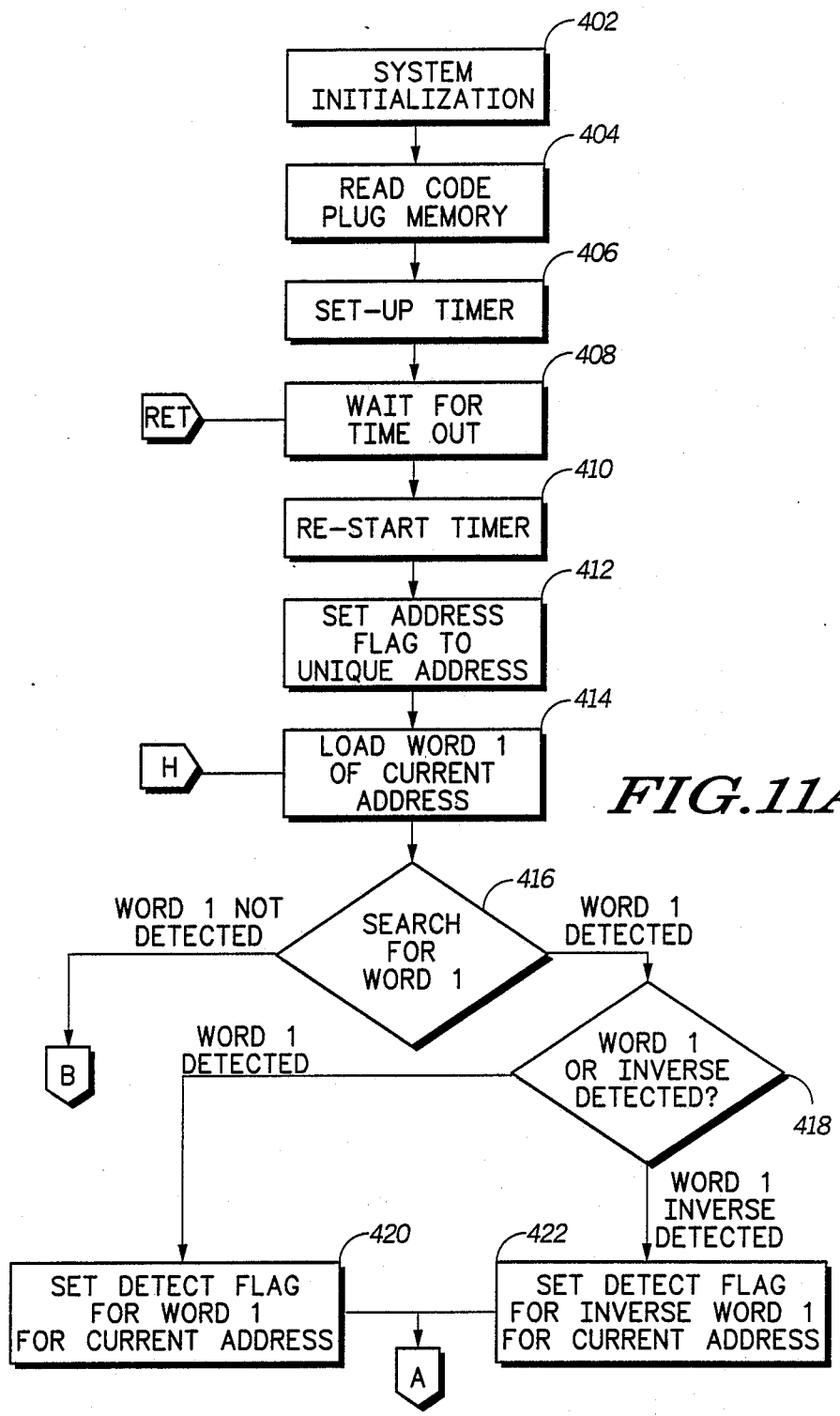
FIGS. 11A-E comprise a program flow chart showing the detection of GSC address words and data blocks by a receiver employing the present invention including the logical branching to appropriate portions of the flow chart based upon detection of the possible combinations of address words, reserved words and program change data.
Figure 11B:
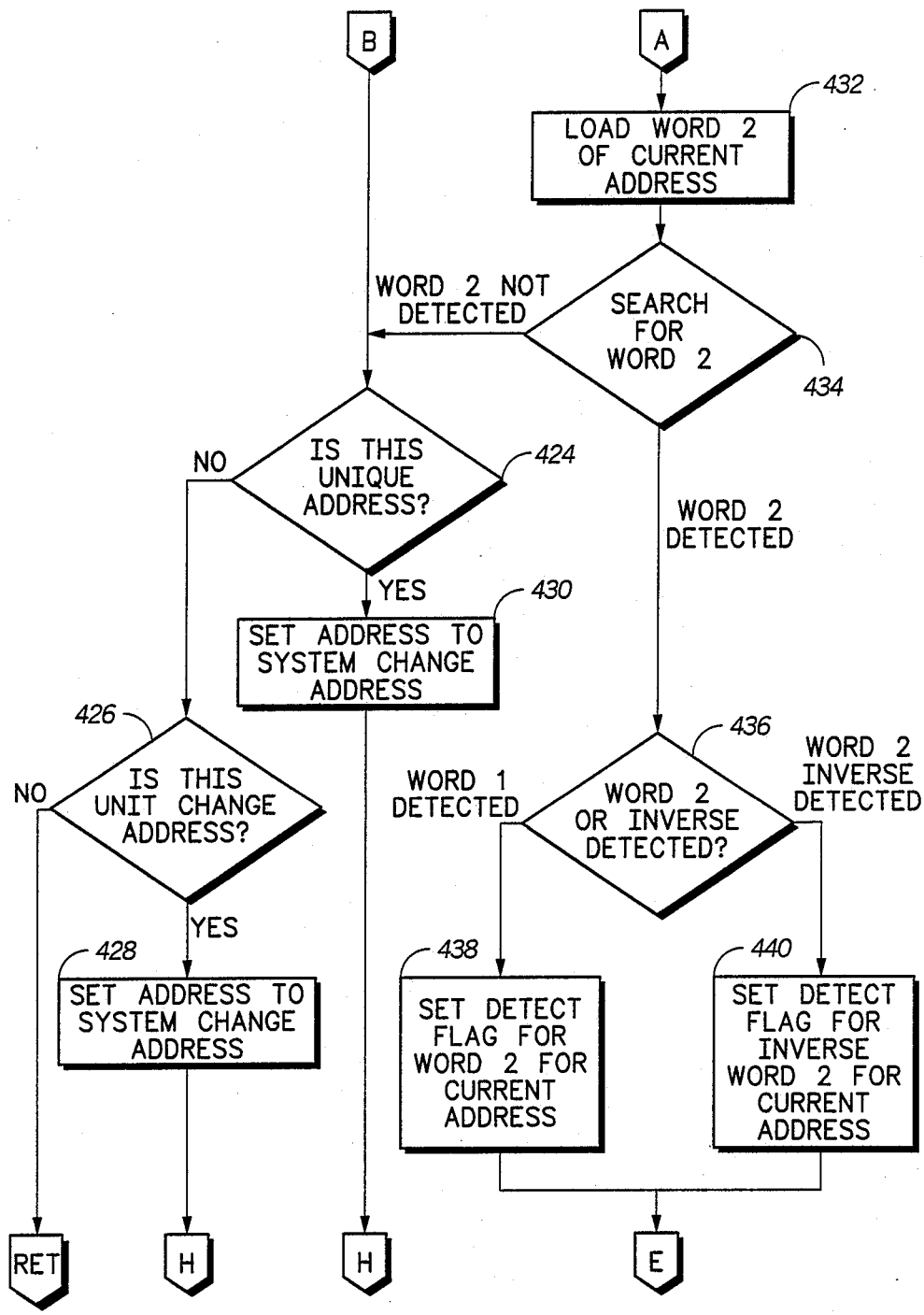

In FIG. 11B, entry is made through continuation block B to a decision block 424 which determines whether the address word that was searched for was a unique or unit address. If the determination is that the current address is not a unique address, then at decision block 626, a determination is made whether this is a unit change address. If the determination is in the negative, the program proceeds through a continuation block RET to the wait for time-out timer 408 in FIG. 11A. If, however, the determination is that this is a unit change address, then at block 428, the system sets the address to the system change address, after which the program proceeds through continuation block H. If the determination at block 424 is that the current address is a unique address then at block 430, the system sets the address to the unit change address, and the program proceeds through continuation block H. Continuation block H returns to the load word 1 of the current address block 414 of FIG. 11A.

The combination of steps that begin with block 424 and end at branch points H and RET serves to change the address code sequence that is being searched for, and allows the decoder to simultaneously search for a unique or individual address signal, the unit change address signal, and the system change or all unit address signal. Although the routine provides for the detection of three address signals in the normal or selective calling mode, it is obvious that the procedure could be revised to provide for a greater or lesser numer of addresses.

Continuing with the description for FIG. 11B, an entry is made through combination block A to a block 432 which loads the word 2 of the current address. A determination is then made whether or not word 2 of the address has been detected at 434. If word 2 has not been detected, the program proceeds to the decision block 424 to test as before whether this is a unique address and proceeds as previously described. If, however, word 2 is detected, then a determination is made at decision block 436 whether word 2 or its inverse has been detected. If word 2 was detected, then a detect flag for word 2 for the current address is set at block 438. If the inverse of word 2 has been detected, then detect flag for the inverse of word 2 for the current address is set at block 440. In either case, after the suitable detect flag has been set, the program proceeds through continuation block E to FIG. 11C.

Figure 11C:
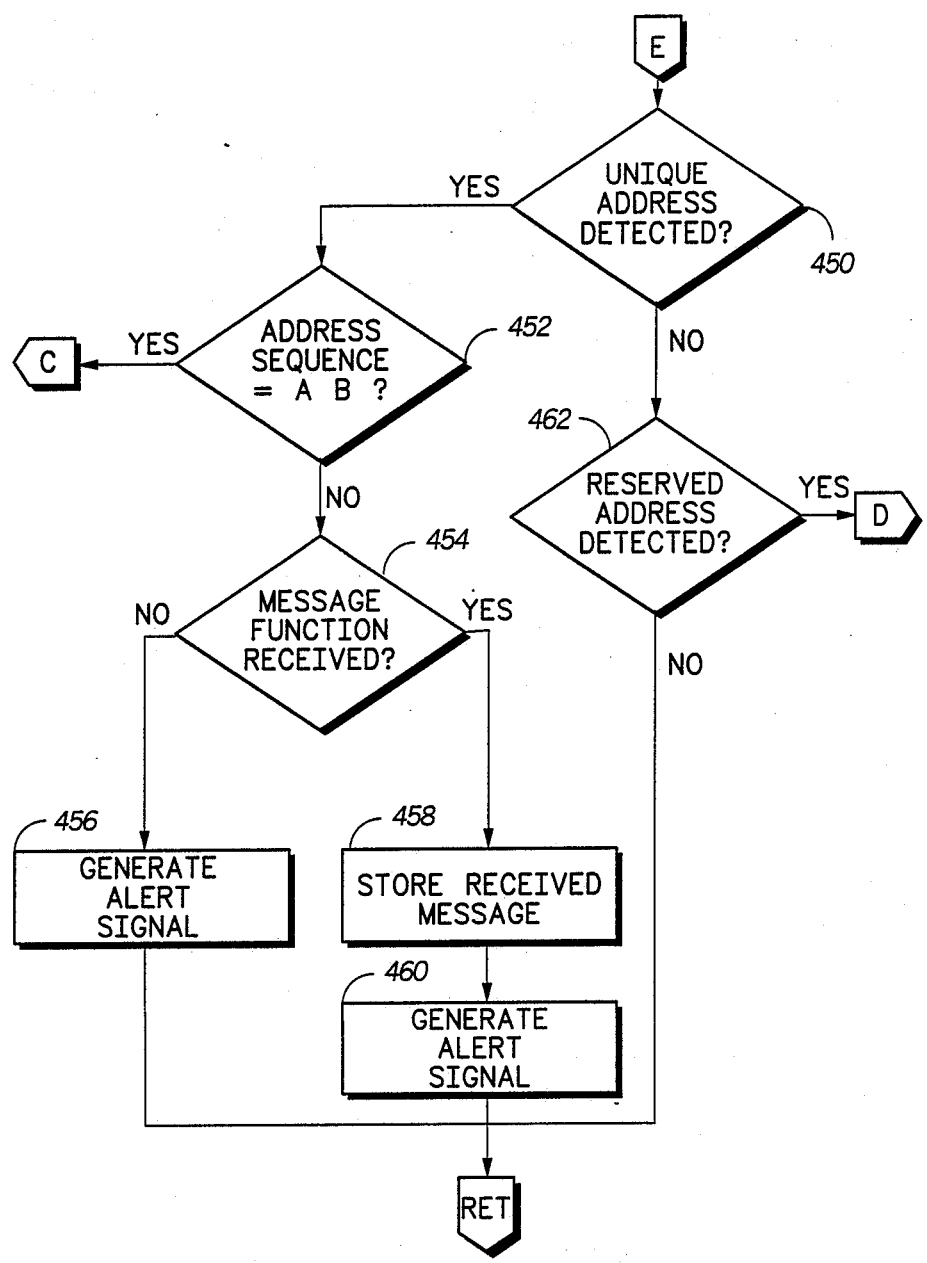

In FIG. 11C, entry is made through continuation block E from FIG. 11B to a decision block 450 to determine whether a unique address has been detected. If a unique address has been detected, a determination is made at decision block 452 whether the address sequence is inverse word A, inverse word B. If the decision is yes, the program exits through a continuation block C to FIG. 11D. If the determination is that the received address sequence is not equal to inverse word A, inverse word B, then decision block 454 determines whether a message function has been received. If no message function has been received, an alert signal is generated at block 456 and the program continues through a continuation block labelled RET to the wait for time-out 408 block of FIG. 11A.

If, however, a message function has been received at 454, then the received data message is stored at 458 and, subsequently, an alert signal is generated at 460. The program then proceeds through continuation block RET. If at decision block 450 no unique address is detected, then a determination is made at decision block 462 whether a reserved address has been detected. If no such reserve address has been detected, the program continues through continuation block RET. Continuation block labelled RET causes a return to the wait for time-out timer 408 block of FIG. 11A. If, however, a reserved address has been detected, the program continues through continuation block D.

Figure 11D:
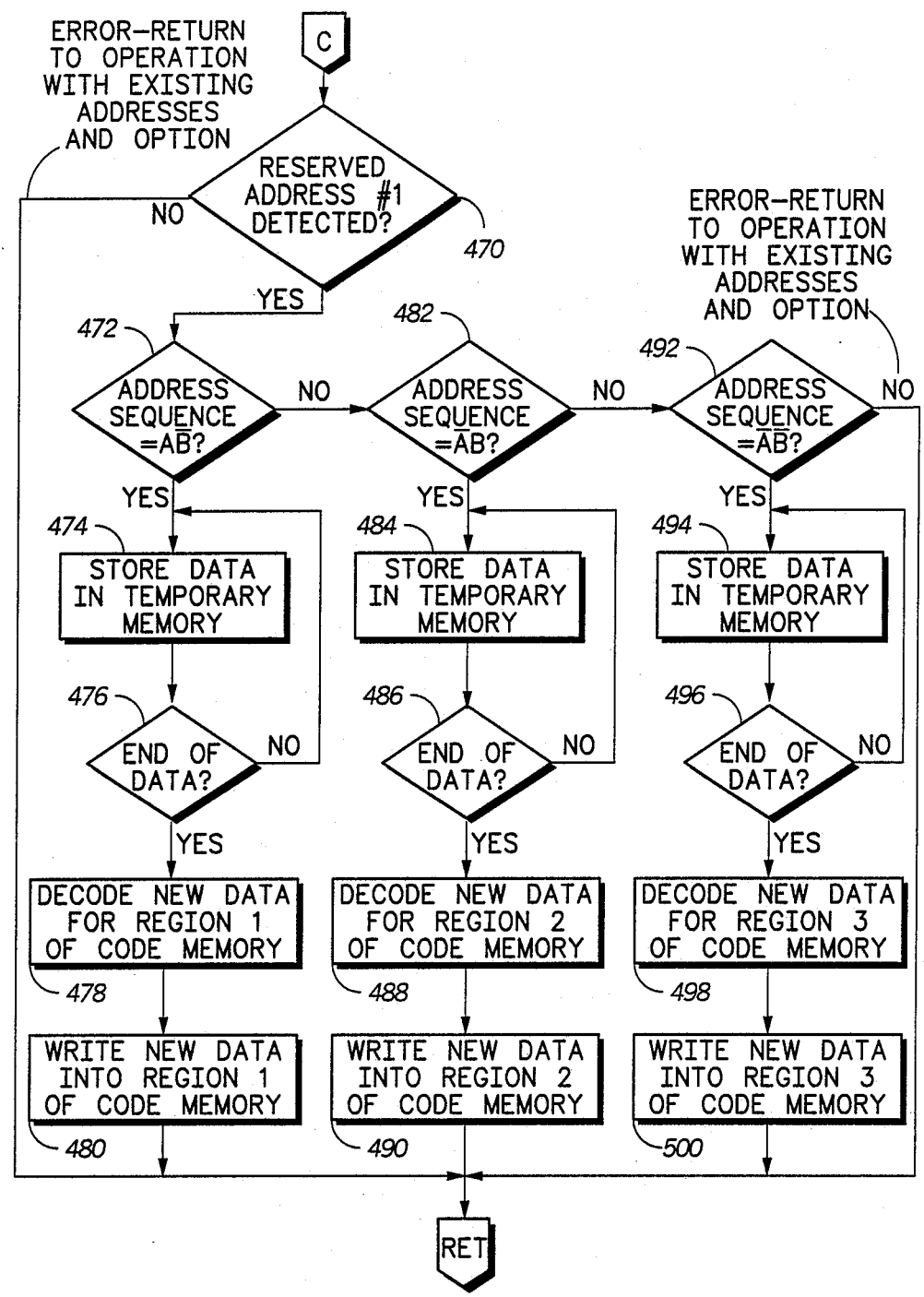
Figure 11E:
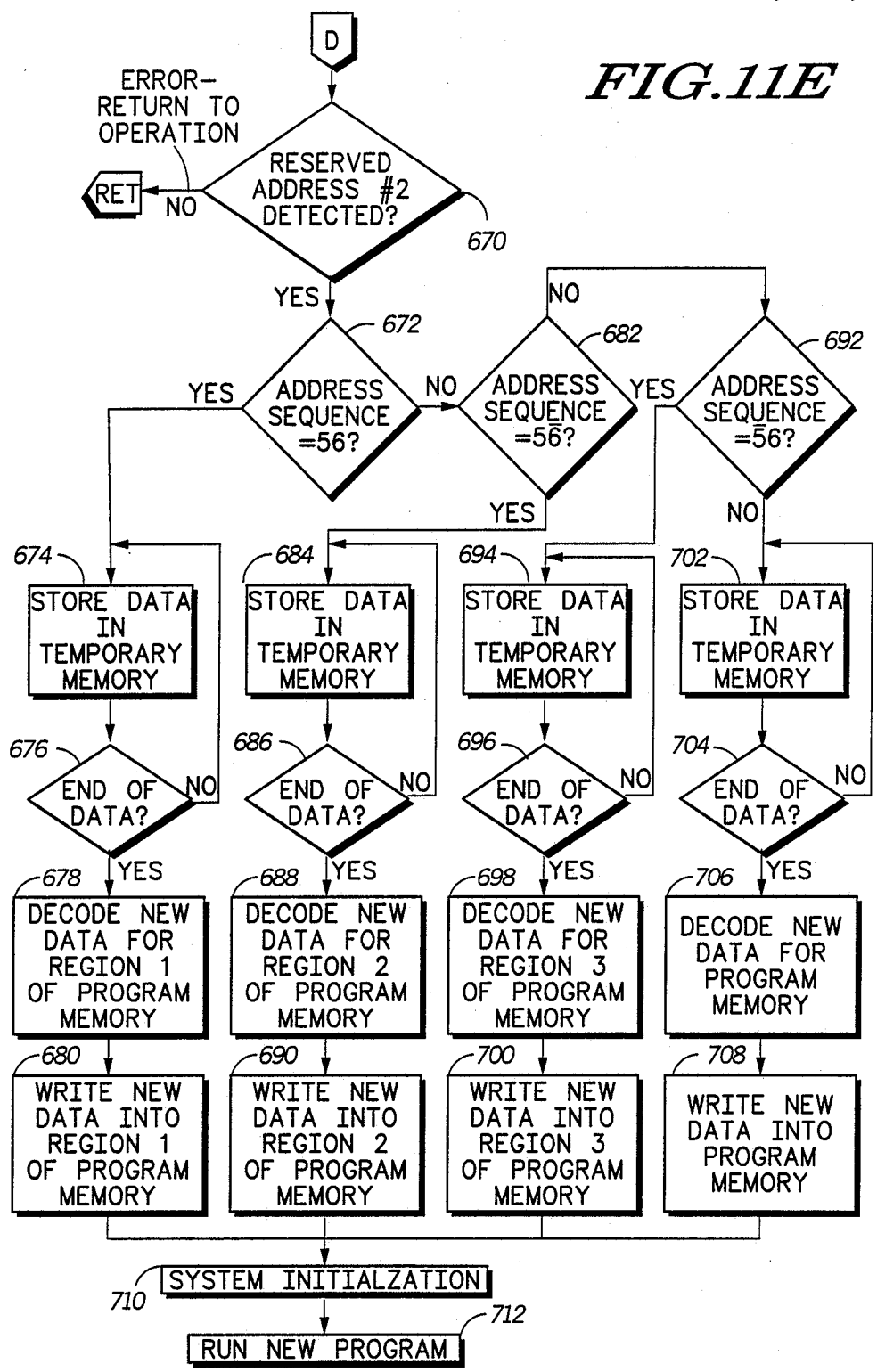

In FIG. 11D, entry is made through continuation block C to decision block 470 which determines whether reserved address 1 has been detected immediately after unique address sequence inverse word A, inverse word B was received. If reserved address 1 has not been detected, then there is an error and a return to the operation with the existing addresses and options is made through continuation block labelled RET. If, however, reserved address number 1 is detected at 470, a determination is made in decision block 472 whether the address sequence for the reserved address number 1 is A inverse B at block 472. If the A inverse B word sequence has been detected, data is stored in temporary memory at block 474 and a determination is made in decision block 476 when the end of data occurs. If the end of data is not detected, a return is made to block 474 to continue storing data in the temporary memory. When the end of data is detected, the new data is decoded for region 1 of the code memory at block 478, after which the new data is written into region 1 of the code memory at 480. The program then continues through continuation block RET.

If the address sequence A inverse B is not detected, a determination is made at decision block 482 whether the address sequence is inverse A, B. If the inverse A,B word sequence is detected, data is stored in temporary memory at block 484 and a determination is made at 486 when end of data occurs. Data continues to be stored in temporary memory until such time as the end of data is detected. When end of data is detected, the new data is decoded for region 2 of the code memory at block 488, after which the new data is written into region 2 of the code memory at block 490. The program then returns through continuation block RET.

If the address sequence is determined not to be inverse A,B, then a determination is made at decision block 492 whether the address sequence is inverse A, inverse B. If the address sequence is determined to inverse A, inverse B, then data is stored in temporary memory at 494 and a determination is made for the occurrence of end of data at 496. Data continues to be stored in temporary memory until an end of data signal is detected. When an end of data is detected, the new data is decoded for region 3 of the code memory at 498 and the new data is written into region 3 of the code memory at block 500. The program at this time, returns through continuation block RET to the wait for time-out block 408 of FIG. 11A. If at decision block 492 it is determined that the address sequence is not inverse A, inverse B, then as a result of the sequential logic, an error has occurred and a return is made to the normal operation with the existing addresses and options. The program returns to the wait for time-out block 408 of FIG. 11A.

In FIG. 11D, entry is made through continuation block D to decision block 670 which determines whether reserved address 2 has been detected. It will be recalled that reserved address 2 is formed by reserved code words 3 and 4. If reserved address 2 has not been detected, then there is an error and a return to the operation is made through continuation block labelled RET. If, however, reserved address number 2 is detected at 670, a determination is made in decision block 672 whether the next immediate address sequence is word 5 word 6 at block 672. Word 5 and word 6 will be used to designate GSC reserved words 5 and 6. If the word 5 word 6 sequence has been detected, data is stored in temporary memory at block 674 and a determination is made in decision block 676 when the end of data occurs. If the end of data is not detected, a return is made to block 674 to continue storing data in the temporary memory. When the end of data is detected, the new data is decoded for region 1 of the program memory at block 678, after which the new data is written into region 1 of the program memory at 680.

If the address sequence word 5 word 6 is not detected, a determination is made at decision block 682 whether the address sequence is word 5 inverse word 6. If the word 5 inverse word 6 sequence is detected, data is stored in temporary memory at block 684 and a determination is made at 686 when end of data occurs. Data continues to be stored in temporary memory until such time as the end of data is detected. When end of data is detected, the new data is decoded for region 2 of the program memory at block 688, after which the new data is written into region 2 of the program memory at block 690.

If the address sequence is determined not to be word 5 inverse word 6, then a determination is made at decision block 692 whether the address sequence is inverse word 5 word 6. If the address sequence is determined to inverse word 5 word 6, then data is stored in temporary memory at 694 and a determination is made for the occurrence of end of data at 696. Data continues to be stored in temporary memory until an end of data signal is detected. When an end of data is detected, the new data is decoded for region 3 of the program memory at 698 and the new data is written into region 3 of the program memory at block 700.

If at decision block 692 it is determined that the address sequence is not inverse word 5 word 6, then as a result of the sequential logic, the word sequence must be inverse word 5 inverse word 6 and the program initiates storing data in temporary memory at 702, followed by the testing to determine the end of data at 704. If the end of data has not been detected, the program continues to store data in the temporary memory. Upon detection of the end of data, the new data is decoded for the entire program memory at 706 and written into the program memory at 708.

After the new data has been read into any or all of the program memory regions, a system initialization similar to 402 is actuated at 710 and the new program begins to run at 712.

To summarize the operation of the present invention in the GSC coding system, the device acts like a conventional selective calling receiver, and can decode and alert to one or more address signals. In addition, it responds to predetermined reserved signalling patterns by reprogramming its operating control memories in accordance with instructions received over-the-air via the signalling channel. The reprogramming mechanism can change the address(es) and options of a individual unit a group of units, and can also change the decoding scheme used in any number of units.

What is claimed is:

1. In a communications receiver device for decoding transmitted radio frequency signals, apparatus for altering the decoding characteristics of the receiver device in response to decoded transmitted radio frequency signals comprising:
    means for receiving transmitted radio frequency signals to produce received signals;
    a selectively reprogrammable, non-volatile memory;
    a programmable decoder coupled to said receiving means and responsive to instructions in said non-volatile memory to cause decoding of the received signals;
    a volatile memory, coupled to said decoder to temporarily store the decoded received signals for subsequent reprogramming; and
    logic means coupled to said decoder, said volatile memory, and said non-volatile memory to enable selective reprogramming of said non-volatile memory with the decoded received signals stored in said volatile memory,
    whereby the decoded received signals can be selectively written into said non-volatile memory to alter the decoding characteristics of the receiver device.

2. The apparatus of claim 1 wherein the received signals include reserved code signals, the reception of which will cause subsequently received signals to be stored in said volatile memory.

3. The apparatus of claim 2 wherein said non-volatile memory further comprises a system portion and an address portion and said logic means further includes enabling means to separately enable reprogramming of said portions.

4. The apparatus of claim 3 wherein said address portion includes an address corresponding to an individual receiver device, and said receiver device further includes annunciator means to produce an alert to the decoding of signals which include that address.

5. The apparatus of claim 3 wherein each of said portions comprise a plurality of distinct regions and said logic means further includes means responsive to information in said reserved code signal to enable reprogramming of an individual one of said plurality of regions of one of said portions.

6. In a radio communications receiver device for decoding transmitted radio frequency signals, apparatus for altering the decoding characteristics of the receiver device in response to decoded transmitted radio frequency signals comprising:

means for receiving transmitted radio frequency signals to produce received signals;
a selectively reprogrammable, non-volatile memory;
a volatile memory;
a microcomputer, coupled to said receiving means and said volatile memory, and responsive to instructions in said non-volatile memory to cause decoding of the received signals and to cause the temporary storing of the same in said volatile memory for subsequent reprogramming, said microcomputer further including means responsive to the detection of predetermined received signals to enable selective reprogramming of said non-volatile memory with the decoded received signals stored in said volatile memory,
whereby received signals decoded by said microcomputer can be selectively written into said nonvolatile memory to alter the decoding characteristics of the receiver device.

7. The apparatus of claim 6 wherein the received signals include reserved code signals, the reception of which will cause subsequently received signals to be stored in said volatile memory.

8. The apparatus of claim 7 wherein said non-volatile memory further comprises a system portion and an address portion and said microcomputer further includes enabling means to separately enable reprogramming of said portions.

9. The apparatus of claim 8 wherein said address portion includes an address corresponding to an individual receiver device, the receiver device further includes annunciator means to produce an alert to the decoding of signals which include that address.

10. The apparatus of claim 8 wherein each of said portions comprises a plurality of distinct regions and said microcomputer further includes means responsive to information in said reserved code signal to enable reprogramming of an individual one of said plurality of regions of one of said portions.

11. In a radio communications receiver device for decoding transmitted radio frequency signals including selective call signals and message signals, apparatus for altering the decoding characteristics of the receiver device in response to decoded transmitted radio frequency signals comprising:

means for receiving transmitted radio frequency signals to produce received signals;
a selectively reprogrammable, non-volatile memory;
a programmable decoder coupled to said receiving means and responsive to instructions in said non-volatile memory to cause decoding of the received signals into selective call signals and message signals;
a volatile memory, coupled to said decoder to temporarily store the decoded received message signals for subsequent reprogramming; and
logic means coupled to said decoder, said volatile memory, and said non-volatile memory and responsive to the selective call signals to enable selective reprogramming of said non-volatile memory with decoded received message signals,
whereby decoded received message signals can be selectively written into said non-volatile memory to alter the decoding characteristics of the receiver device.

12. The apparatus of claim 11 wherein said received message signals further include reserved code signals, the reception of which will initiate subsequently received message signals to be stored in said volatile memory for reprogramming of said non-volatile memory.

13. The apparatus of claim 12 wherein said non-volatile memory comprises a system portion and an address portion and said logic means further includes enabling means to separately enable reprogramming of said portions.

14. The apparatus of claim 13 wherein said non-volatile memory includes at least one address corresponding to an individual receiver device, the receiver device further includes annunciator means to produce an alert to the decoding of signals which include that address.

15. The apparatus of claim 13 wherein said non-volatile memory portions each comprise a plurality of individually addressable regions and said reserved code signals designate at least one of said plurality of regions of one of said portions for reprogramming.

16. In a radio communications receiver device for decoding transmitted radio frequency signals including selective call signals and message signals, said device including a non-volatile code memory containing at least address information corresponding to an individual receiver device, apparatus for altering the address decoding characteristics of the receiver device in response to decoded transmitted radio frequency signals comprising:

means for receiving transmitted radio frequency signals to produce received signals;
a selectively reprogrammable, non-volatile code memory;
a decoder coupled to said receiving means and said non-volatile code memory to cause decoding of the received signals into selective call signals and message signals, and for detection of received selective call signals corresponding to the address information of the individual receiver device;
a volatile memory, coupled to said decoder to temporarily store the decoded received message signals for subsequent reprogramming; and
logic means coupled to said decoder, said volatile memory, and said non-volatile code memory and responsive to the decoding of the message signals to enable selective reprogramming of said non-volatile code memory with decoded received message signals stored in said volatile memory,
whereby the decoded message signals can be selectively written into said non-volatile code memory to alter the decoding characteristics of the receiver device.

17. The apparatus of claim 16 wherein said decoded received message signals includes reserved code signals, the reception of which will initiate subsequently decoded received message signals to be stored in said volatile memory for subsequent reprogramming of said non-volatile code memory.

18. The apparatus of claim 17 wherein said non-volatile code memory further includes a portion containing information corresponding to the individual receiver address and a portion containing information relating to receiver device features and options and said logic means further includes enabling means to separately enable reprogramming of each of said portions.

19. The apparatus of claim 18 wherein said receiver device further includes annunciator means to produce an alert to the decoding of signals which include an address corresponding to the individual receiver device.

20. In a communications receiver system having a plurality of receiver devices with reprogrammable decoding characteristics, an encoder for encoding frequency signals for altering the decoding characteristics of receiver devices in response to the transmitted signals comprising:
 means for encoding radio signals including selective call signals for addressing receiver devices, reserved code signals to initiate reprogramming, and message signals containing reprogramming information for transmission; and
 means for transmitting said encoded radio signals,
 whereby encoded message signals are transmitted to enable receiver devices with reprogrammable decoding characteristics.

21. A method for reprogramming selected communication receivers by over-the-air transmissions comprising the steps of:
 (a) encoding radio frequency signals including selective call signals for addressing receiver devices and message signals for reprogramming;
 (b) transmitting the encoded signals;
 (c) receiving transmitted radio signals and producing received signals;
 (d) decoding received selective call and message signals by a programmable decoder responsive to instructions contained in a non-volatile memory and temporarily storing the message signals in a volatile memory;
 (e) identifying the selective call signals corresponding to the selected receivers; and
 (f) reprogramming the non-volatile memory with the decoded received message signals stored in the volatile memory to alter the decoding characteristics of selected receivers.

22. The method of claim 21 further including the steps of:
 in step (a), encoding reserved code signals prior to said message signals; and
 prior to step (f), decoding said received reserved code signals to initiate reprogramming.

23. A method for reprogramming a selected communication receiver by over-the-air transmissions comprising the steps of:
 (a) receiving transmitted radio signals including selective call signals and message signals and producing received signals;
 (b) decoding the received signals by a programmable decoder responsive to instructions contained in a non-volatile memory and temporarily storing the same in a volatile memory;
 (c) identifying the selective call signals corresponding to the selected receiver and message signals for reprogramming; and
 (d) reprogramming the non-volatile memory with the decoded received message signals stored in the volatile memory to alter the decoding characteristics of the selected receiver.

24. The method of claim 23 further including the step of:
 prior to step (d), decoding reserved code signals to initiate reprogramming.

* * * * *